United States Patent [19]
Ruider et al.

[11] 3,821,191
[45] June 28, 1974

[54] AZO PIGMENTS OF THE AMINOANTHRAQUINONYLAZO-HYDROXYNAPHTHOIC ACID SERIES

[75] Inventors: Guenther Ruider, 5 Frankenthal; Peter Dimroth, Ludwigshafen, both of Germany

[73] Assignee: Badische Anilin & Soda Fabrik Aktiengesellschaft, Ludwigshafen, Germany

[22] Filed: Dec. 2, 1971

[21] Appl. No.: 204,310

[52] U.S. Cl............. 260/152, 8/4, 106/23, 106/288 Q, 106/300, 106/308 N, 106/311, 117/123 C, 117/138.8 R, 117/138.8 PV, 117/138.8 E, 117/139, 117/143 R, 117/147, 117/154, 260/37 R, 260/41 C, 260/154, 260/165, 260/155, 260/202, 260/256.4 Q, 260/287 R, 260/326 A, 260/326 D, 260/326 N

[51] Int. Cl....... C09b 1/16, C09b 21/36, D06p 1/44

[58] Field of Search.......... 260/152, 154, 155, 156, 260/165

[56] References Cited
UNITED STATES PATENTS

| | | | |
|---|---|---|---|
| 1,758,313 | 5/1930 | Eckert et al. | 260/152 |
| 3,356,672 | 12/1967 | Schefczik | 260/152 |
| 3,402,166 | 9/1968 | Heckl et al. | 260/152 |
| 3,468,872 | 9/1969 | Schefczik et al. | 260/152 |
| 3,509,122 | 4/1970 | Horstmann et al. | 260/157 |
| 3,513,153 | 5/1970 | Horstmann et al. | 260/152 |
| 3,600,374 | 8/1971 | Mory | 260/152 |
| 3,627,748 | 12/1971 | Roueche et al. | 260/152 |
| 3,634,388 | 1/1972 | Horstmann et al. | 260/152 |
| 3,644,405 | 2/1972 | Horstmann et al. | 260/156 |
| 3,699,126 | 10/1972 | Peters et al. | 260/329.2 |

*Primary Examiner*—Floyd D. Higel
*Attorney, Agent, or Firm*—Johnston, Keil Thompson & Shurtleff

[57] ABSTRACT

Azo pigments of the formula

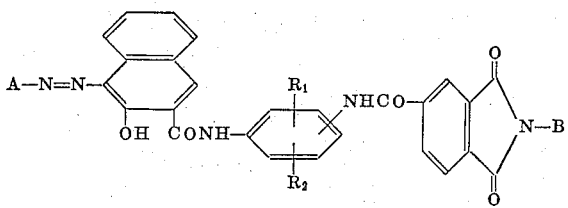

where A is an aminoanthraquinone, $R_1$ and $R_2$ are substituents and B is hydrogen, alkyl, aralkyl, aryl or heteroaryl, which are useful for dope dyeing, for print pastes for printing, for production of colored surface coatings, for dyeing phenoplasts, aminoplasts or thermoplasts, for textile printing, and in high grade printing inks. These pigments are particularly suitable for coloring polyvinyl chloride, polyethylene or polypropylene with excellent fastness to light, migration and overcoating.

2 Claims, No Drawings

AZO PIGMENTS OF THE AMINOANTHRAQUINONYLAZO-HYDROXYNAPHTHOIC ACID SERIES

The invention relates to dyes having the general formula:

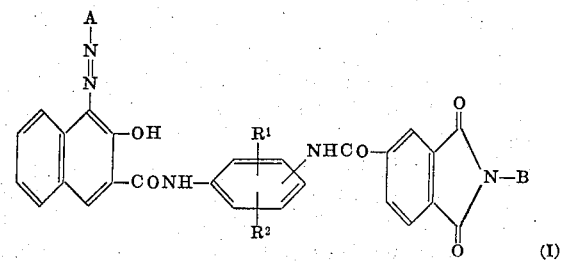

(I)

in which
- A denotes the radical of a 1-aminoanthraquinone or 2-aminoanthraquinone which may bear chlorine as a substituent in the 3-position or 4-position or of 2,4,5-trichloroaniline;
- $R^1$ denotes hydrogen, chlorine, bromine, alkyl, alkoxy, methylsulfonyl, cyano, carbamoyl, N-arylcarbamoyl or carboalkoxy;
- $R^2$ denotes hydrogen, chlorine, bromine, alkyl, alkoxy or carboalkoxy; and
- B denotes hydrogen, unsubstituted or substituted alkyl or aralkyl, or aryl having one to three rings which may bear substituents and which may have ring heteroatoms; and the —NH—CO groups in formula (I) are in meta-position or para-position to each other.

In addition to the individual meanings of $R^1$ and $R^2$ already specified, they may denote ethyl, ethoxy or carboethoxy and preferably methyl, methoxy or carbomethoxy.

Examples of N-arylcarbamoyl radicals for $R^1$ are N-phenylcarbamoyl, and N-phenylcarbamoyl or N-naphthylcarbamoyl bearing chlorine, bromine, phenyl, methyl, methoxy, carbamoyl, sulfonamido, carbomethoxy or cyano as substituents.

The radical B may denote (apart from hydrogen): methyl, ethyl, n-propyl, isopropyl, n-butyl, isobutyl, t-butyl, β-hydroxyethyl, benzyl, phenylethyl, phenyl, and phenyl, naphthyl or anthraquinonyl bearing fluorine, chlorine, bromine, methyl, ethyl, isopropyl, trifluoromethyl, methoxy, ethoxy, phenoxy, chlorophenoxy, phenyl, benzoyl, cyano, carbomethoxy, carbamoyl, sulfonamido, acetoxy, benzoyloxy, methylsulfonyloxy, phenylsulfonyloxy, tolylsulfonyloxy, methylsulfonyl, methylmercapto, acetylamino, benzoylamino, chlorobenzoylamino, methylbenzylamino or nitro as substituents and the radicals of the formulae:

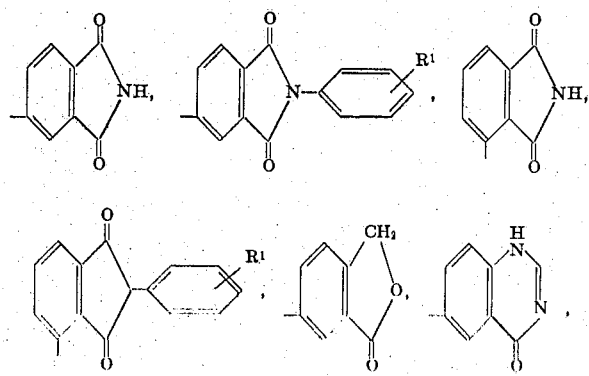

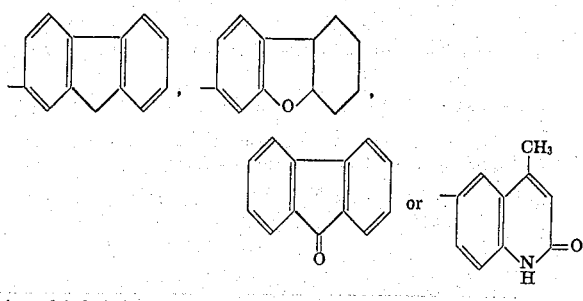

in which $R^1$ has the meanings given above.

Dyes of the general formula (Ia):

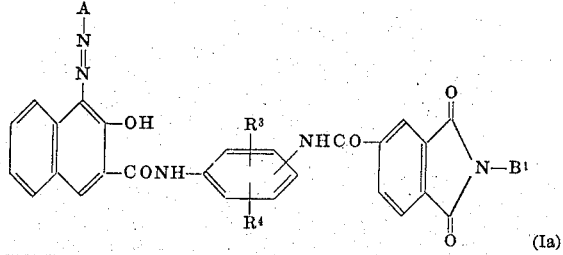

(Ia)

in which
- $R^3$ denotes hydrogen, chlorine, cyano, methyl or methoxy;
- $R^4$ denotes hydrogen, chlorine, methyl or methoxy; and
- $B^1$ denotes phenyl or naphthyl which may bear chlorine, methyl, ethyl, methoxy, ethoxy, phenoxy, benzoyl, phenyl, carbomethoxy, carboethoxy, cyano, sulfonamido, carbamoyl, N-phenylsulfonamido or N-phenylcarbamoyl as substitutents, or a radical of the formula:

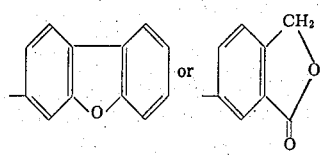

and A has the meanings given above are of special industrial interest. A is preferably an anthraquinone radical and particularly a 1-aminoanthraquinone radical. Dyes having the formula (Ia) in which $R^3$ and $R^4$ are hydrogen are particularly easily accessible.

For the production of the new dyes,
a. a carboxyl halide of the formula (2):

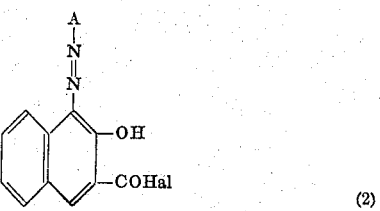

(2)

in which Hal denotes chlorine or bromine may be condensed with an amine of the formula (3):

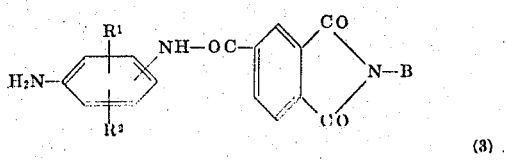

(3)

or b. the diazo compound of an amine of the formula (4)

$$A - NH_2 \qquad (4)$$

may be coupled with a coupling component of the formula (5):

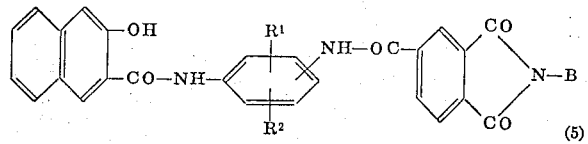

(5)

The azo dye carboxylic acids on which the azo dye acid halides (2) are based may be prepared by a conventional method by coupling a diazonium salt of the amine (4) with β-oxynaphthoic acid.

Conversion of the azo dye carboxylic acid into the acid halide may be carried out in a conventional way by treating it with chlorinating or brominating agents such as $POCl_3$, $PBr_3$, $SOCl_2$ or $COCl_2$, preferably in an inert solvent such as nitrobenzene, chlorinated benzenes, xylenes, or N-methylpyrrolidone with an addition of a catalytic amount of dimethylformamide or pyridine.

Examples of amines of the formula (3) with the $NH_2$ groups in the meta-position or para-position to the —NHOC— group are:

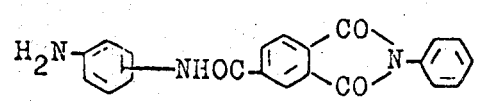

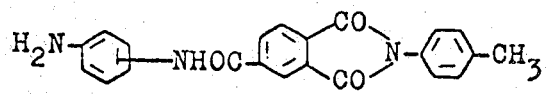

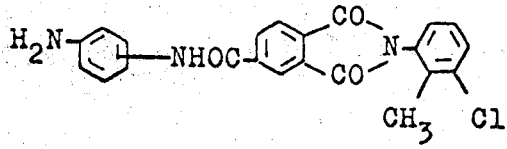

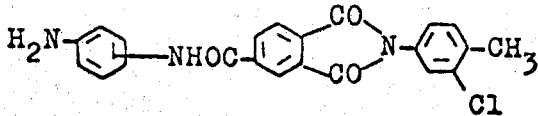

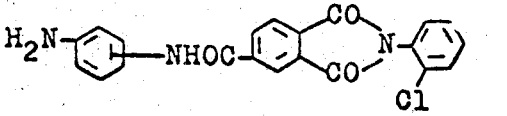

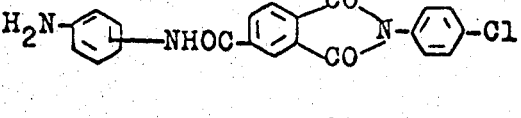

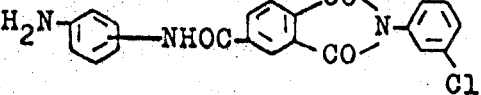

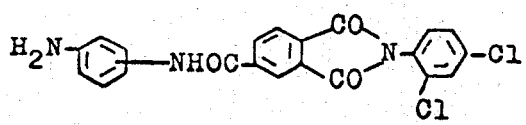

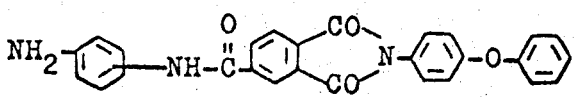

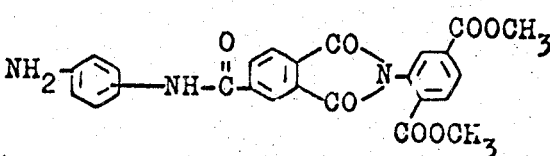

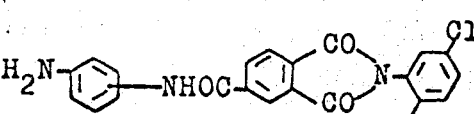

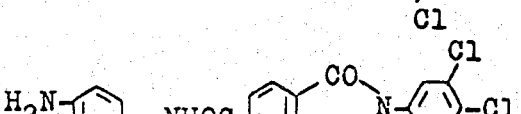

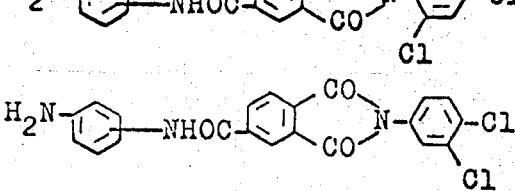

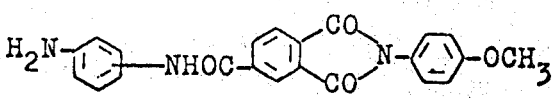

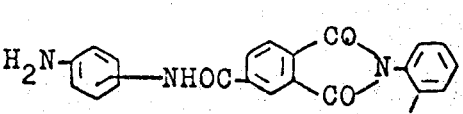

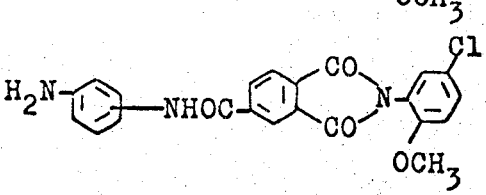

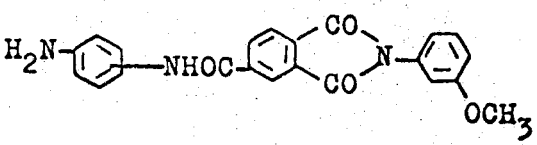

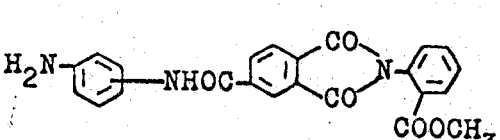

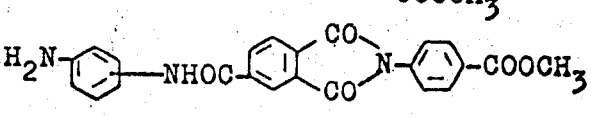

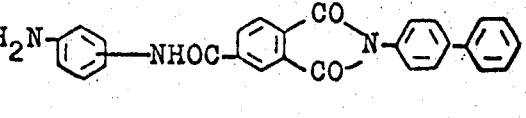

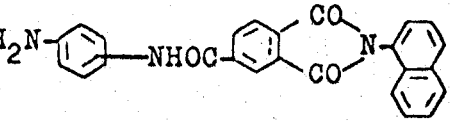

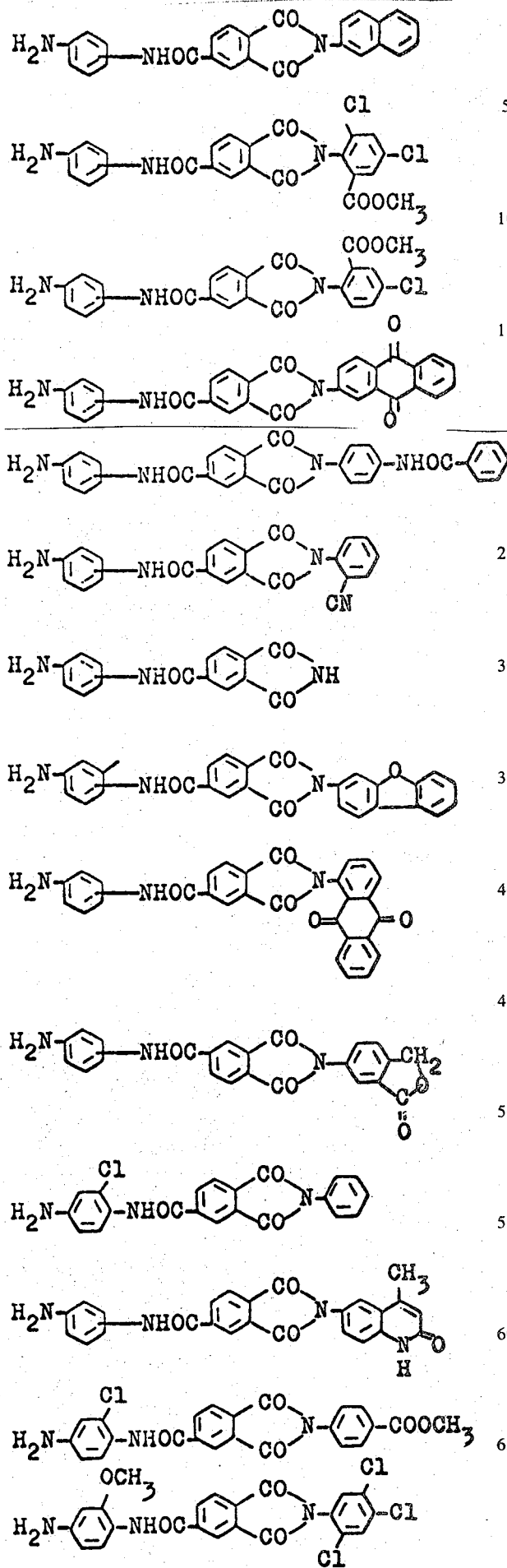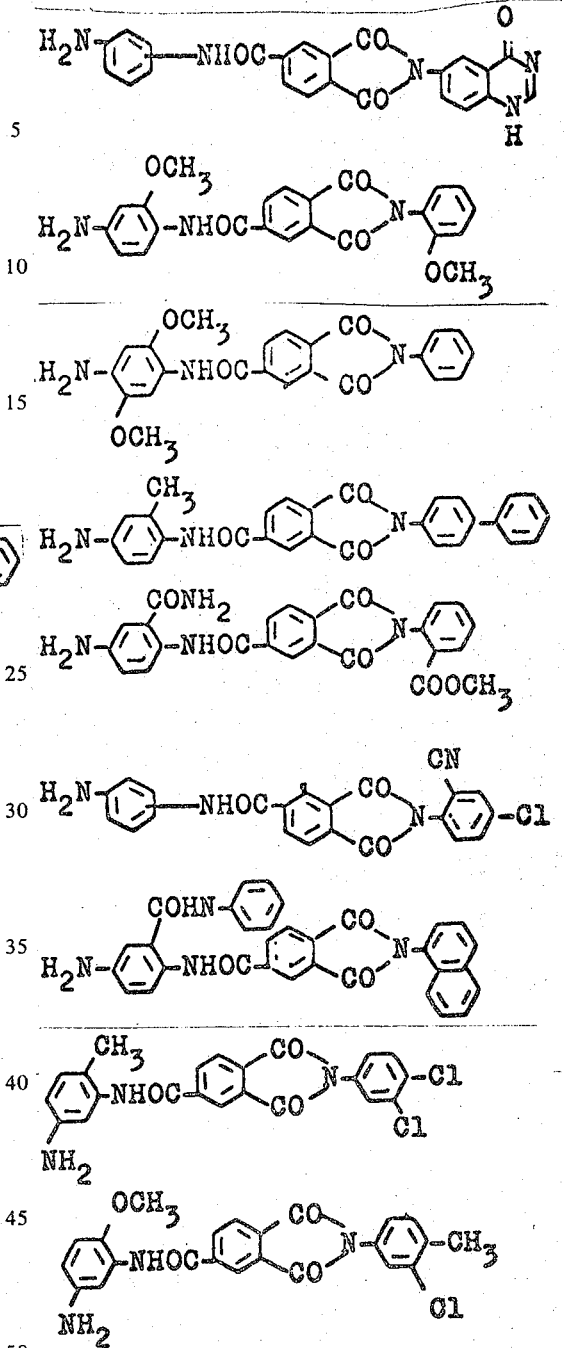

The condensation of the azocarboxylic acid halides of formula (2) with the amines of formula (3) is advantageously carried out by heating in an organic solvent such as o-dichlorobenzene, nitrobenzene, methyl benzoate, xylene, dimethylformamide or N-methylpyrrolidone and it is also possible to add an acid-binding agent such as sodium acetate or pyridine or a catalytic amount of a compound such as collidine or N-methylpyrrolidone which accelerate the acylation reaction at temperatures of more than 100°C.

In the case of sparingly soluble amines of formula (3) it is advantageous to dissolve them in just a sufficient amount of N-methylpyrrolidone or dimethylformamide and then to use this solution for the reaction with the azocarboxylic acid halide of the formula (2) which may be dissolved for example in o-dichlorobenzene.

The coupling components of the formula (5) may be prepared for example by condensation of 2-hydroxynaphthalene-3-carboxylic acid chloride with amines of the formula (3) in the presence of a chlorinating agent such as phosphorus trichloride.

Coupling of the compounds of formula (5) with the diazo compounds of formula (4) is advantageously carried out by bringing together an aqueous alkaline solution of the coupling component or a very finely divided suspension of the coupling component in water with or without the addition of an organic solvent with the acid diazo solution. A pH range of 4 to 7 (advantageously adjusted by adding a buffer such as sodium acetate) and the addition of wetting or dispersing agents, for example aralkyl sulfonates, make for a uniform course of the reaction. The new dyes may also be prepared by the modified process of French Pat. No. 1,537,423.

The pigments of the invention are obtained in a very pure chemical condition, but occasionally not in the optimum physical form for all applications. By conventional measures such as size reduction, salt grinding or recrystallization they may be brought into a form adapted to the particular application. The new pigments may be used for the dope dyeing for example of viscose, for the production of colored print pastes for book printing or offset printing, for the production of colored surface coatings, for example nitrocellulose lacquers, acrylate lacquers, melamine resin lacquers or alkyd resins, for dyeing phenoplasts or aminoplasts, thermoplastics such as polystyrene, polyolefins or polyvinyl chloride, rubber or silicone resins, laminate papers or boards, and for textile printing.

The new pigments are particularly suitable for coloring polyvinyl chloride, polyethylene or polypropylene and also in surface coatings and high grade printing inks.

The invention is illustrated by the Examples in which the parts (unless otherwise stated) and percentages are by weight. Temperatures are given in °C.

EXAMPLE 1

216 parts of the dye obtained by coupling diazotized 1-aminoanthraquinone with 2-hydroxynaphthoic acid-3 is heated with 1,300 parts of o-dichlorobenzene, 195 parts of thionyl chloride and 5 parts of dimethylformamide for 5 hours at 110° to 120° while stirring.

After the reaction mixture has cooled, the uniformly crystalline azo dye monocarboxylic acid chloride is isolated by suction filtration, and washed with 200 parts of o-dichlorobenzene, then with 600 parts of benzene and then with 1,000 parts of cyclohexane. After drying at 80° at subatmospheric pressure, 178 parts of a red crystal powder is obtained.

| Analysis: | calculated: | Cl = 8.05% |
|---|---|---|
| | found: | Cl = 8.5%. |

22 parts of the azo dye carboxylic acid chloride thus obtained is stirred into 780 parts of dry o-dichlorobenzene and then 24.9 parts of finely powdered amine of the formula:

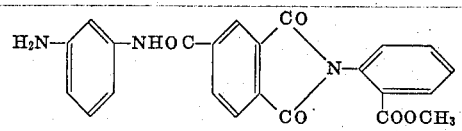

and 5 parts of dimethylformamide are added and the whole is heated for 5 hours at 140° to 150°. After cooling to 80°, the precipitated sparingly soluble pigment is suction filtered, washed with a little hot o-dichlorobenzene or cold dimethylformamide and then with cold methanol until the filtrate running away is clear.

To improve the pigment it may be boiled in methanol or another solvent or stirred at room temperature. After drying at 80° at subatmospheric pressure, 32.0 parts of red powder is obtained which is practically insoluble in the usual solvents. Polyvinyl chloride film and sheeting and also surface coatings are colored red shades of excellent fastness to light, migration and overcoating.

The pigment has the formula:

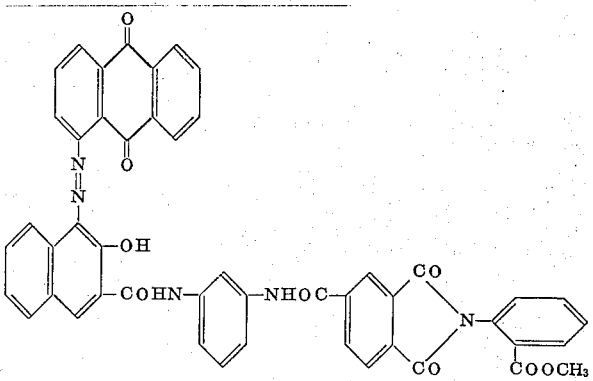

| Analysis: | calculated: | N = 8.55% |
|---|---|---|
| | found: | N = 8.4% |

Other monoazo pigments are obtained with the components in the following Table by coupling 1 mole of the diazo compound of an amine specified in column I with 1 mole of 2-hydroxynaphthoic acid-(3), converting the resultant monoazo dye carboxylic acid obtained into the acid chloride and condensing it with 1 mole of the amine specified in column II.

Column III indicates the shade of a lacquer coating prepared with the pigment obtained:

| Example | I | II | III |
|---|---|---|---|
| 2 | ![structure: 1-aminoanthraquinone with NH2 at position] | ![structure: H2N-phenyl-NHOC-phthalimide-N-phenyl-COOCH3] | Bluish red. |
| 3 | Same as above | ![structure: H2N-phenyl-NHOC-phthalimide-N-phenyl with Cl, Cl] | Yellowish red |

| | | | |
|---|---|---|---|
| 4 | do | 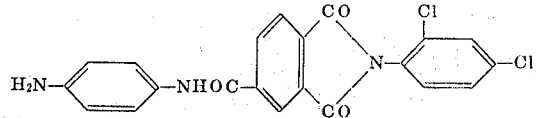 | Bluish red. |
| 5 | do | 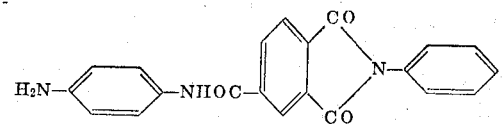 | Do. |
| 6 | do | 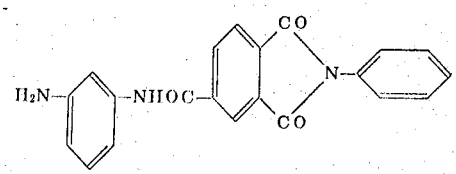 | Do. |
| 7 | do | 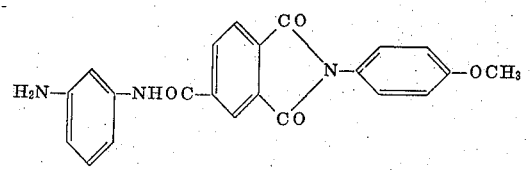 | Yellowish red. |
| 8 | do | 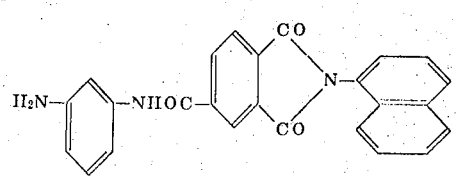 | Red. |
| 9 | do | 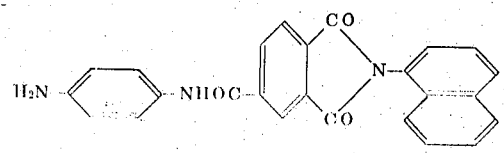 | Bluish red. |
| 10 | do | 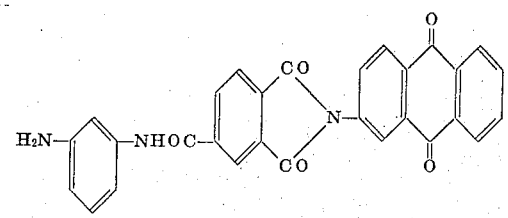 | Red. |
| 11 | do | 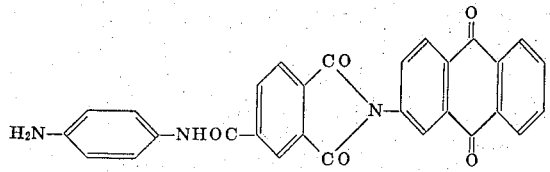 | Bluish red. |
| 12 | | 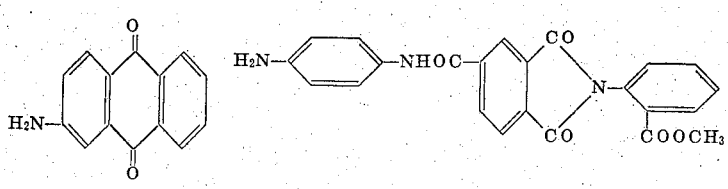 | Do. |
| 13 | Same as above | 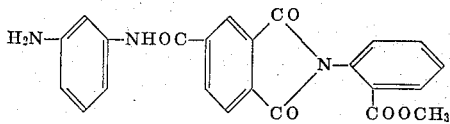 | Do. |

| | | | |
|---|---|---|---|
| 14 | do | 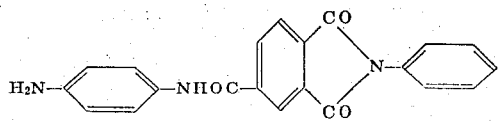 | Do. |
| 15 | do | 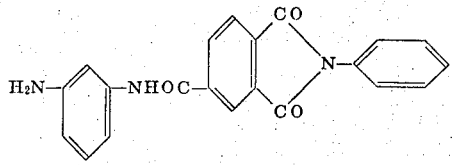 | Violet. |
| 16 | do | 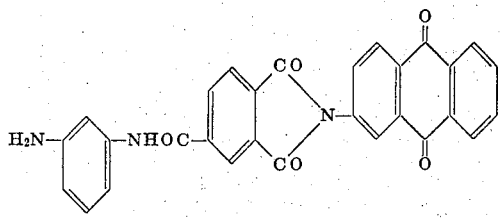 | Red. |
| 17 | do | 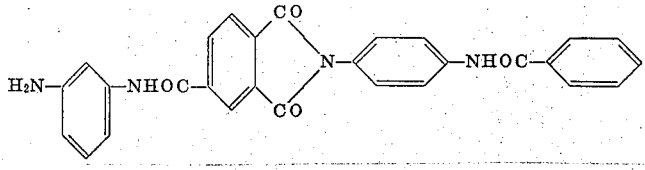 | Bluish red. |

EXAMPLE 18

22.0 parts of the azo dye carboxylic acid chloride obtained according to Example 1 is heated in 780 parts of dry o-dichlorobenzene at about 80°. Then a hot solution of 23.2 parts of the amine of the formula:

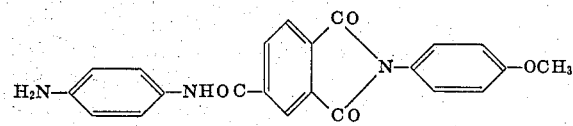

in 200 parts of N-methylpyrrolidone-(2) or dimethylformamide is added and the whole is heated for 5 hours at 140° to 150°.

After cooling to 80°, the sparingly soluble pigment deposited in finely crystalline form is suction filtered and washed with a little hot o-dichlorobenzene or cold dimethylformamide of N-methylpyrrolidone-(2) and then with cold methanol until the filtrate running away is clear. To improve the pigment it may be boiled up for 2 hours with methanol or another solvent or stirred at room temperature.

After drying at subatmospheric pressure at 80° 29.0 parts of a red powder is obtained which is practically insoluble in the usual solvents. Polyvinyl chloride film and sheeting and coating compositions are colored therewith red shades of excellent fastness to light, migration and overcoating.

The pigment has the formula:

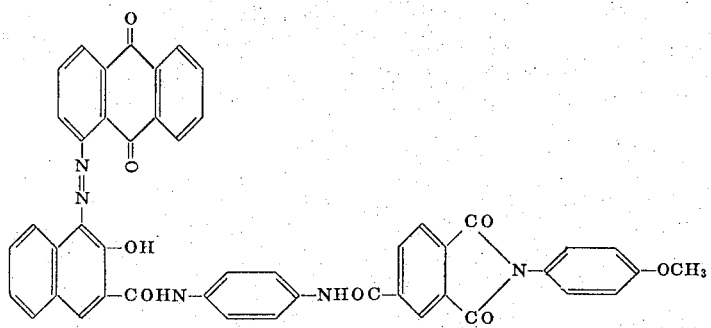

Analysis: calculated: N = 8.85%
found: N = 9.1%.

Other monoazo pigments are obtained with the components of the following Table by coupling 1 mole of the diazo compound of the amine specified in column I with 1 mole of 2-hydroxynaphthoic acid-(3), converting the monoazo dye carboxylic acid obtained into the acid chloride and condensing it with 1 mole of the amine specified in column II.

Column III indicates the shade of the lacquer coating prepared with the pigment obtained.

| Example | I | II | III |
|---|---|---|---|
| 19 | 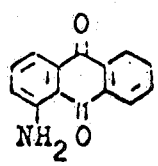 | 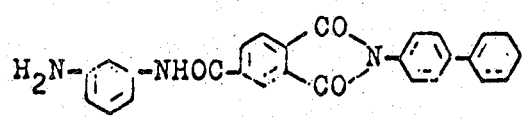 | red |
| 20 | " | 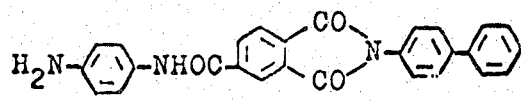 | bluish red |
| 21 | " | 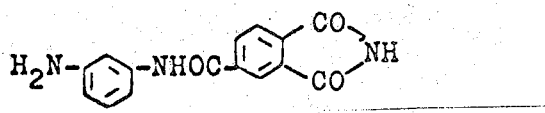 | brown red |
| 22 | " | 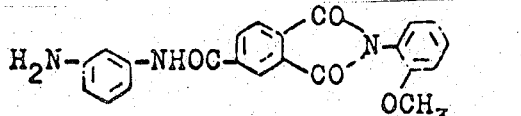 | red |
| 23 | " | 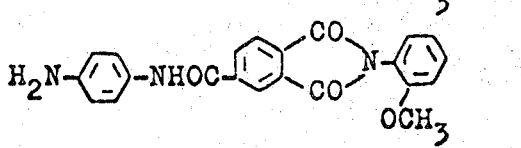 | bluish red |
| 24 | " | 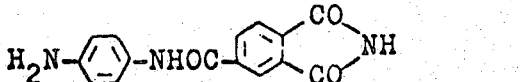 | red |
| 25 | " | 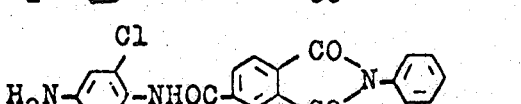 | red |
| 26 | 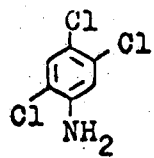 | 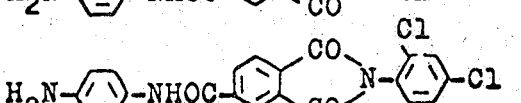 | red |
| 27 | " | 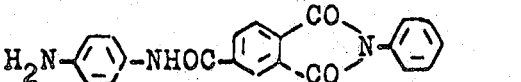 | red |
| 28 | 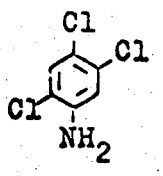 | 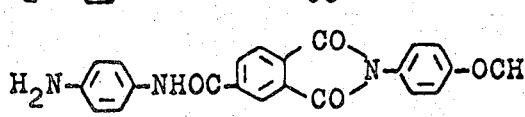 | orange |
| 29 | " | 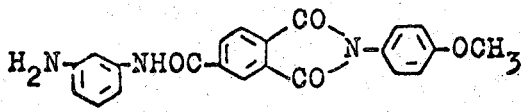 | yellowish red |
| 30 | " | 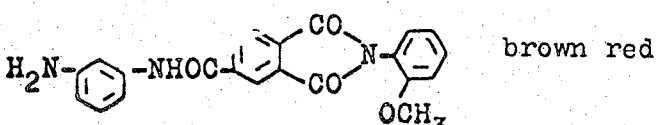 | brown red |
| 31 | " | 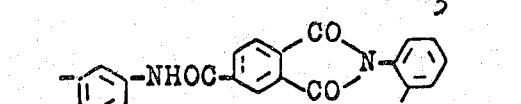 | red |
| 32 | " | 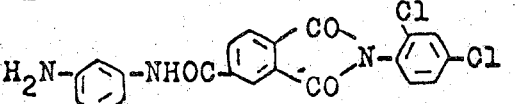 | brown red |
| 33 | " | 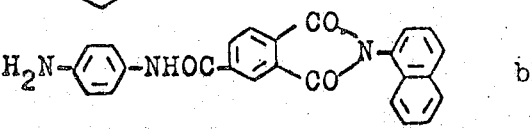 | bluish red |

| 34 | " | 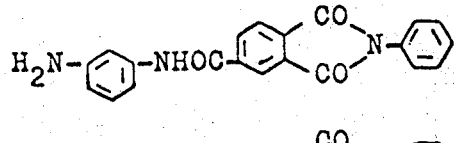 | brown red |
| 35 | 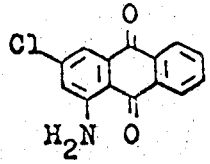 | 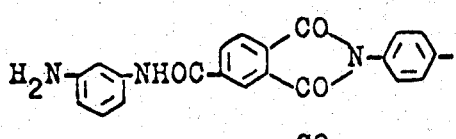 | red |
| 36 | " | 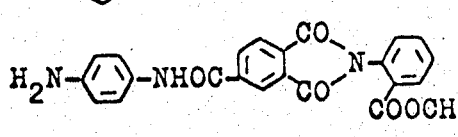 | red |
| 37 | " | 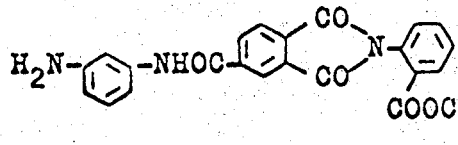 | bluish red |
| 38 | " | 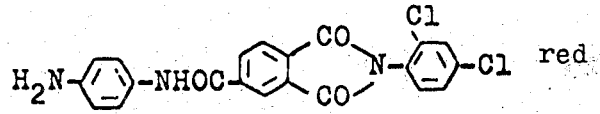 | red |
| 39 | " | 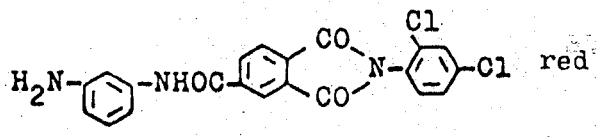 | red |
| 40 | 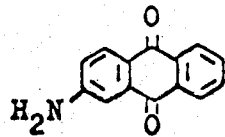 | 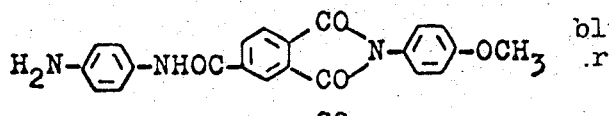 | red |
| 41 | " | 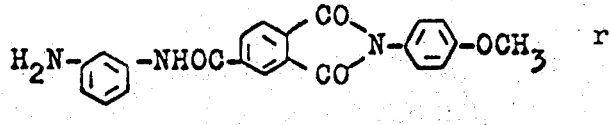 | red |
| 42 | " | 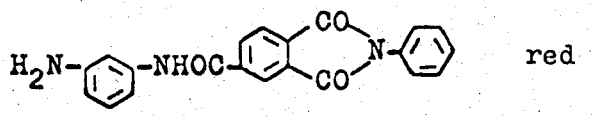 | bluish red |
| 43 | " | 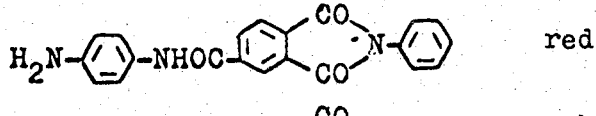 | red |
| 44 | 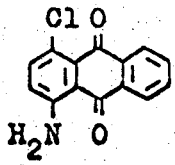 | 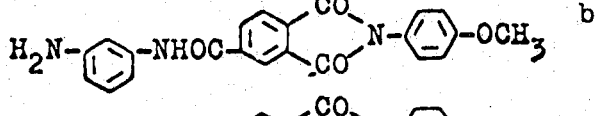 | red |
| 45 | " | 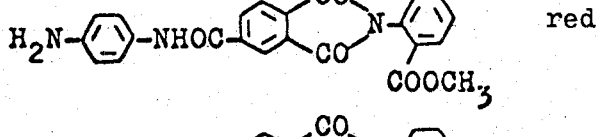 | red |
| 46 | " | 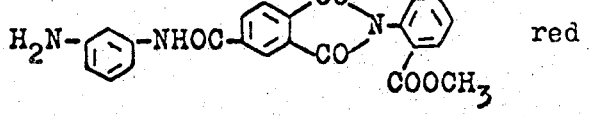 | bluish red |
| 47 | " | | red |
| 48 | " | | red |

| No. | Structure 1 | Structure 2 | Color |
|---|---|---|---|
| 49 | " | H₂N—⟨⟩—NHOC—⟨⟩(CO)₂N—⟨⟩(2,5-Cl₂) | bluish red |
| 50 | 1-aminoanthraquinone | H₂N—⟨⟩—NHOC—⟨⟩(CO)₂N—⟨⟩—NHOC—⟨⟩ | yellowish red |
| 51 | " | H₂N—⟨⟩—NHOC—⟨⟩(CO)₂N—anthraquinonyl | bluish red |
| 52 | " | H₂N—⟨⟩—NHOC—⟨⟩(CO)₂N—⟨⟩(2,6-Cl₂) | red |
| 53 | 1-aminoanthraquinone | H₂N—⟨⟩—NHOC—⟨⟩(CO)₂N—⟨⟩(2,5-Cl₂) | red |
| 54 | " | H₂N—⟨⟩—NHOC—⟨⟩(CO)₂N—⟨⟩—Cl (3-Cl) | red |
| 55 | " | H₂N—⟨⟩—NHOC—⟨⟩(CO)₂N—⟨⟩—Cl (3,4-Cl₂) | red |
| 56 | " | H₂N—⟨⟩—NHOC—⟨⟩(CO)₂N—⟨⟩—CH₃ | red |
| 57 | " | H₂N—⟨⟩—NHOC—⟨⟩(CO)₂N—⟨⟩—CH₃ | red |
| 58 | " | H₂N—⟨⟩—NHOC—⟨⟩(CO)₂N—⟨⟩—CH₃ (2-Cl) | red |
| 59 | " | H₂N—⟨⟩—NHOC—⟨⟩(CO)₂N—⟨⟩—CH₃ (2-Cl, 4-CH₃) | red |
| 60 | " | H₂N—⟨⟩—NHOC—⟨⟩(CO)₂N—⟨⟩ (2-Cl, 5-OCH₃) | bluish red |
| 61 | " | H₂N—⟨⟩—NHOC—⟨⟩(CO)₂N—⟨⟩ (2-Cl, 5-OCH₃) | bluish red |
| 62 | " | H₂N—⟨⟩—NHOC—⟨⟩(CO)₂N—⟨⟩ (2-CH₃, 5-OCH₃) | yellowish red |
| 63 | " | H₂N—⟨⟩—NHOC—⟨⟩(CO)₂N—⟨⟩ (2-CH₃, 5-OCH₃) | bluish red |

| | 19 | 20 | |
|---|---|---|---|
| 64 | " | 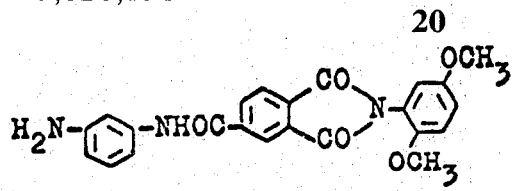 | red |
| 65 | 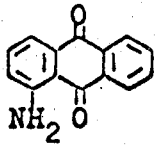 | 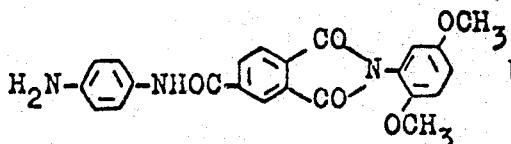 | bluish red |
| 66 | " | 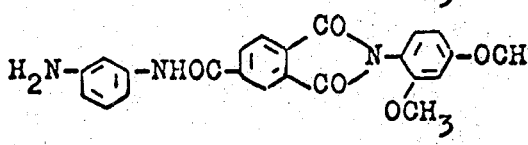 | bluish red |
| 67 | " | 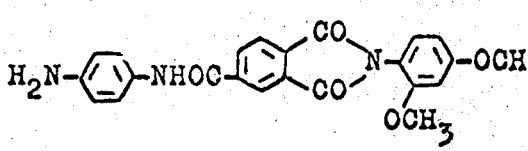 | bluish red |
| 68 | " | 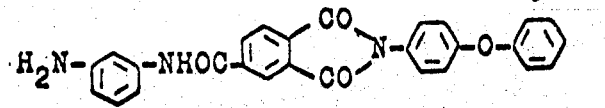 | bluish red |
| 69 | " | 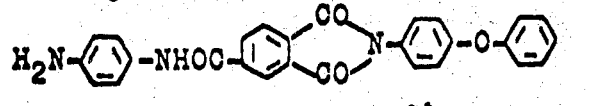 | bluish red |
| 70 | " | 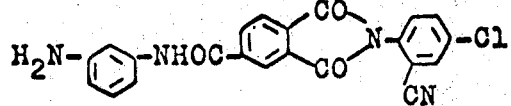 | red brown |
| 71 | " | 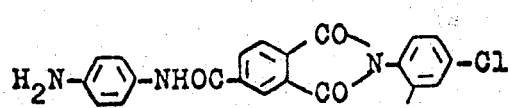 | red |
| 72 | " | 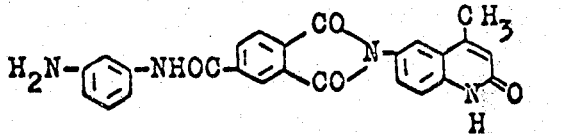 | red |
| 73 | " | 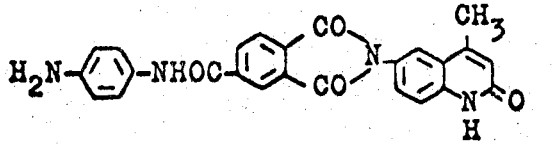 | red |
| 74 | " | 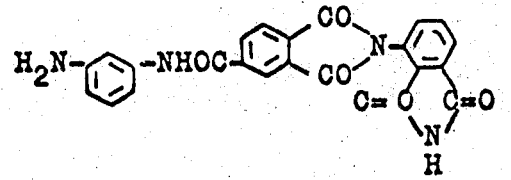 | red |
| 75 | " | 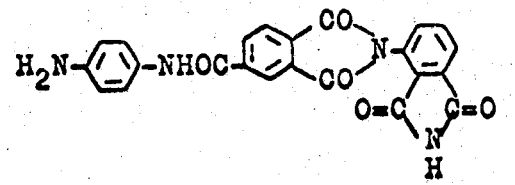 | red |

| | 21 | 22 | |
|---|---|---|---|
| 76 | 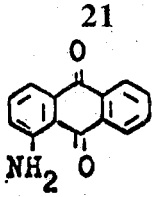 | H₂N-⟨⟩-NHOC-⟨⟩-(CO)₂N-⟨⟩-SO₂NH-⟨⟩ | yellowish red |
| 77 | " | H₂N-⟨⟩-NHOC-⟨⟩-(CO)₂N-⟨⟩-SO₂NH-⟨⟩ | yellowish red |
| 78 | " | H₂N-⟨⟩-NHOC-⟨⟩-(CO)₂N-dibenzofuranyl | red |
| 79 | " | H₂N-⟨⟩-NHOC-⟨⟩-(CO)₂N-dibenzofuranyl | bluish red |
| 80 | " | H₂N-⟨⟩-NHOC-⟨⟩-(CO)₂N-quinazolinone | red |
| 81 | " | H₂N-⟨⟩-NHOC-⟨⟩-(CO)₂N-quinazolinone | red |
| 82 | " | H₂N-⟨⟩-NHOC-⟨⟩-(CO)₂N-⟨⟩-CH₂-O-CO | brown |
| 83 | " | H₂N-⟨⟩-NHOC-⟨⟩-(CO)₂N-⟨⟩-CH₂-O-CO | red |
| 84 | " | H₂N-⟨⟩-NHOC-⟨⟩-(CO)₂N-⟨⟩-(CO)₂N-⟨⟩ | brown |
| 85 | " | H₂N-⟨⟩-NHOC-⟨⟩-(CO)₂N-⟨⟩-(CO)₂N-⟨⟩ | red |
| 86 | 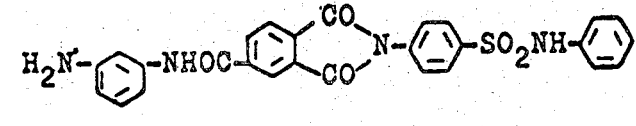 | H₂N-⟨⟩-NHOC-⟨⟩-(CO)₂N-⟨⟩-(CO)₂N-⟨⟩ | red |
| 87 | " | H₂N-⟨⟩-NHOC-⟨⟩-(CO)₂N-⟨⟩-(CO)₂N-⟨⟩ | red |
| 88 | " | H₂N-⟨⟩-NHOC-⟨⟩-(CO)₂N-⟨⟩-(CO)₂NH | red |
| 89 | 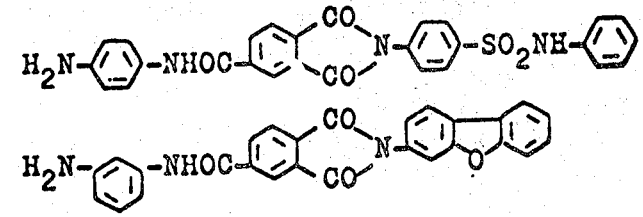 | H₂N-⟨⟩-NHOC-⟨⟩-(CO)₂N-⟨⟩-(CO)₂NH | red |
| 90 | " | H₂N-⟨⟩-NHOC-⟨⟩-(CO)₂N-⟨⟩-CH₂-CO-O | red |

| | 23 | 24 | |
|---|---|---|---|
| 91 | " | 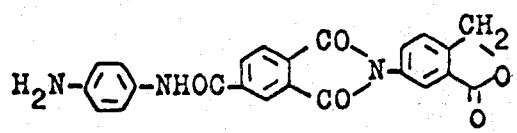 | red |
| 92 | " | 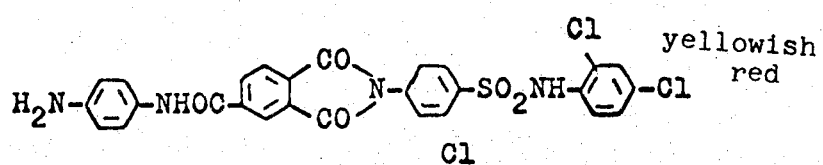 | yellowish red |
| 93 | 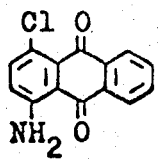 | 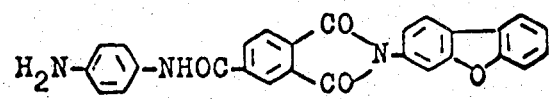 | bluish red |
| 94 | " | (benzofuran variant) | bluish red |
| 95 | 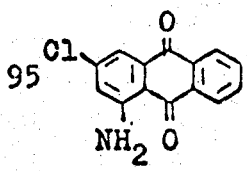 | 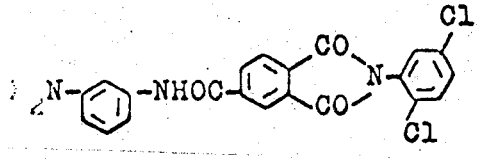 | bluish red |
| 96 | " | 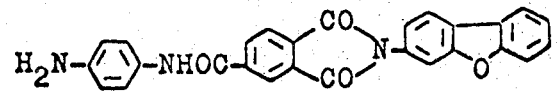 | red |
| 97 | " | 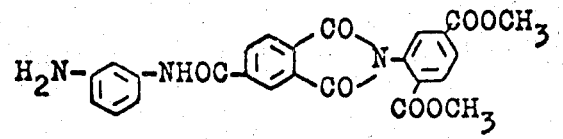 | bluish red |
| 98 | " | 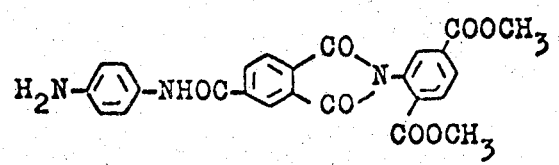 | red |
| 99 | " | (dimethyl ester variant) | red |
| 100 | " | 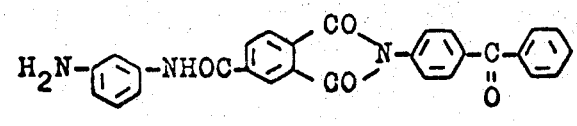 | red |
| 101 | 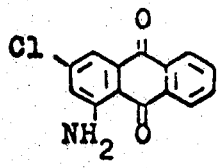 | 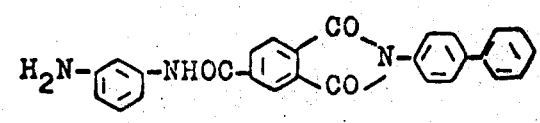 | red |
| 102 | " | (biphenyl variant) | red |
| 103 | 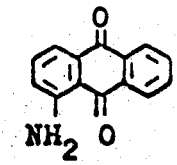 | 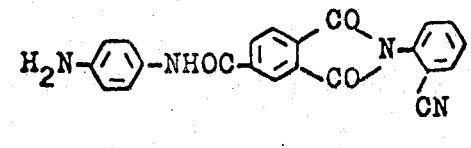 | red |
| 104 | " | (CN variant) | red |

| | | | |
|---|---|---|---|
| 105 | " | 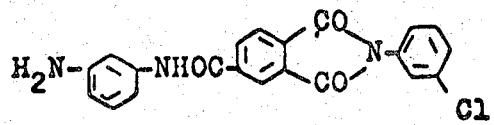 | red |
| 106 | " | 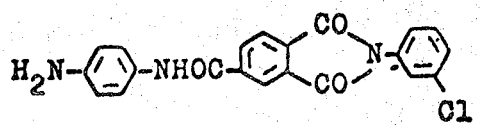 | red |
| 107 | " | 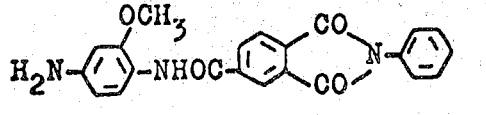 | bluish red |
| 108 | " | 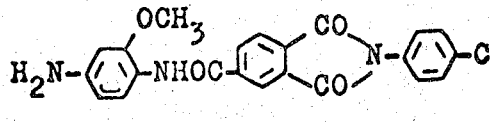 | bluish red |
| 109 | " | 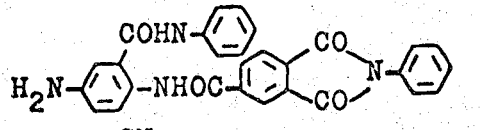 | red |
| 110 | " | 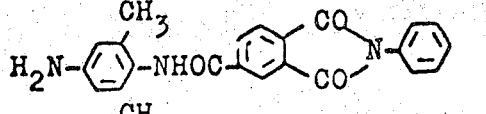 | red |
| 111 | " | 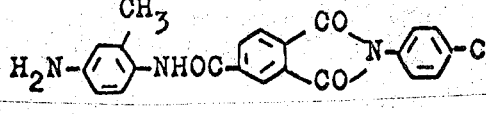 | red |
| 112 | " | 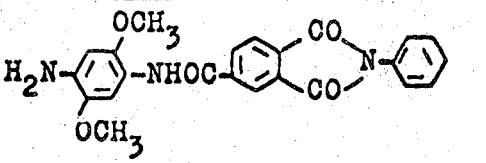 | violet |
| 113 | " | 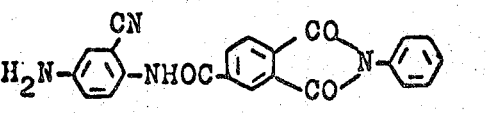 | red |
| 114 | 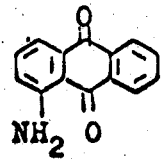 | 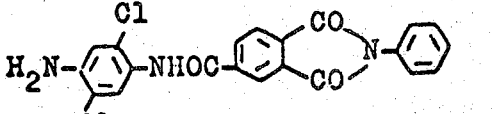 | red |
| 115 | " | 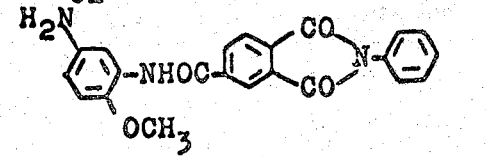 | red |
| 116 | " | 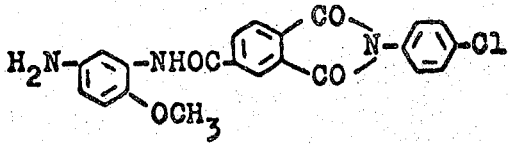 | bluish red |
| 117 | " | 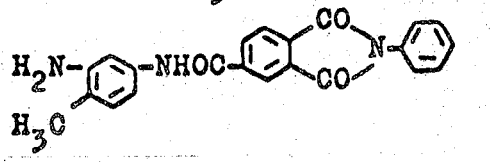 | bluish red |
| 118 | " |  | red |

| | | | |
|---|---|---|---|
| 119 | " | 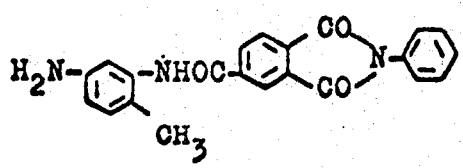 | red |
| 120 | 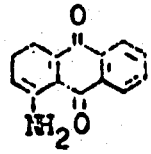 | 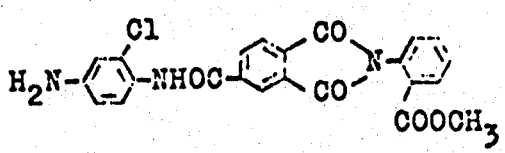 | red |
| 121 | " | 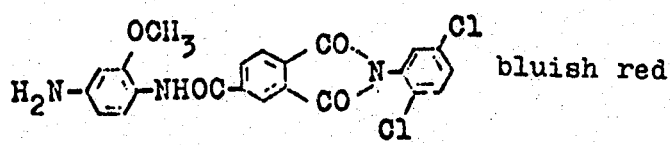 | bluish red |
| 122 | " | 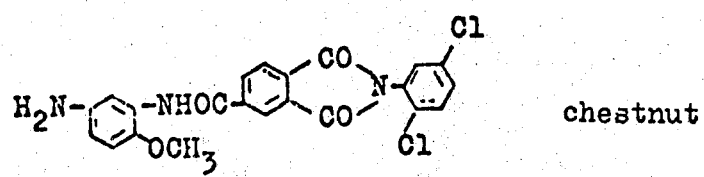 | chestnut |
| 123 | " | 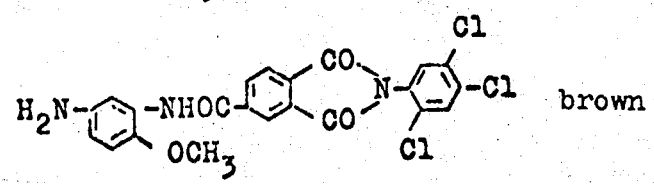 | brown |
| 124 | " | 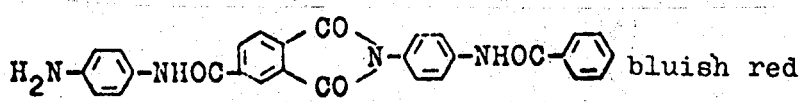 | bluish red |
| 125 | " | 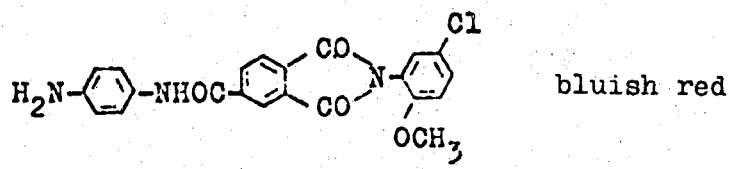 | bluish red |
| 126 | " | 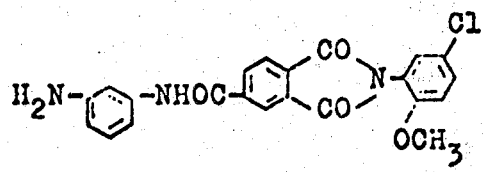 | red |
| 127 | " | 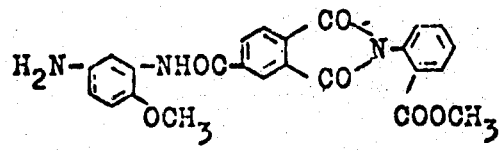 | brown red |
| 128 | " | 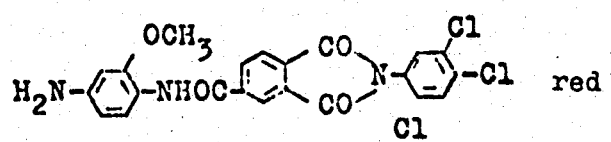 | red |
| 129 | " | 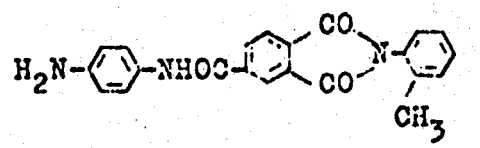 | red |

| # | 29 | 30 | |
|---|---|---|---|
| 130 | 2-amino-benzophenone (2-NH2, 2'-CO-phenyl) | H2N–⟨⟩–NHOC–⟨⟩(CO)2N–⟨⟩-CH3 (2-CH3) | orange |
| 131 | " | H2N–⟨⟩–NHOC–⟨⟩(CO)2N–⟨⟩(2-CH3, 4-OCH3) | red |
| 132 | " | H2N–⟨⟩–NHOC–⟨⟩(CO)2N–⟨⟩(2-CH3, 4-Cl) | red |
| 133 | " | H2N–⟨⟩–NHOC–⟨⟩(CO)2N–⟨⟩(2-CH3, 3-Cl) | red |
| 134 | " | H2N(3-), CH3(2-)–⟨⟩–NHOC–⟨⟩(CO)2N–⟨⟩(2,4,6-Cl3) | red |
| 135 | " | H2N–⟨⟩–NHOC–⟨⟩(CO)2N–⟨⟩-Cl (2-Cl) | red |
| 136 | " | H2N–⟨⟩(3-CH3)–NHOC–⟨⟩(CO)2N–⟨⟩(2,4,6-Cl3) | red |
| 137 | " | H2N–⟨⟩–NHOC–⟨⟩(CO)2N–⟨⟩(3-CH3, 4-Cl) | red |
| 138 | " | H2N–⟨⟩–NHOC–⟨⟩(CO)2N–⟨⟩-Cl (2-Cl) | orange |
| 139 | " | H2N–⟨⟩–NHOC–⟨⟩(CO)2N–⟨⟩(3-CH3, 5-Cl) | red |
| 140 | 1-aminoanthraquinone | H2N–⟨⟩–NHOC–⟨⟩(CO)2N–⟨⟩-Cl | red |

| | 31 | 32 | |
|---|---|---|---|
| 141 | " | 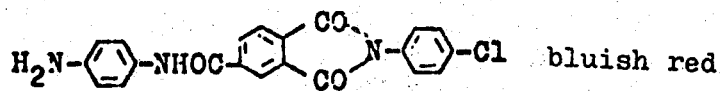 | bluish red |
| 142 | " | 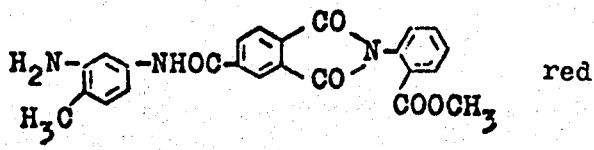 | red |
| 143 | " | 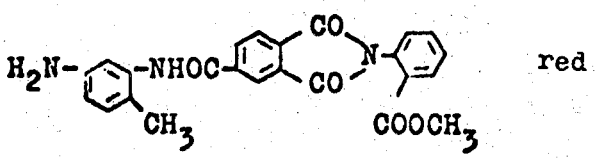 | red |
| 144 | " | 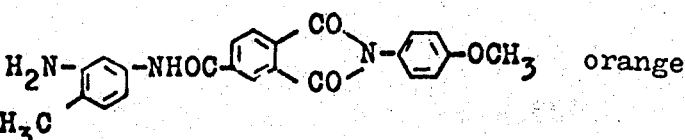 | orange |
| 145 | " | 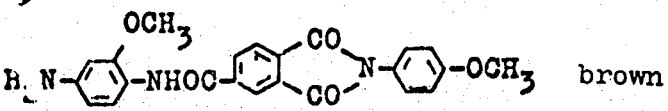 | brown |
| 146 | " | 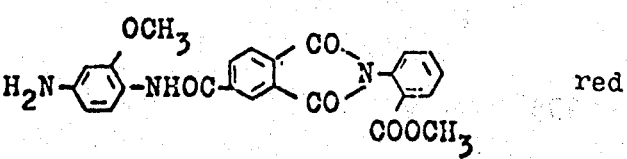 | red |
| 147 | " | 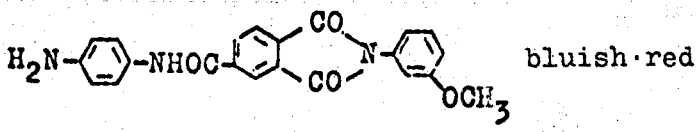 | bluish·red |
| 148 | " | 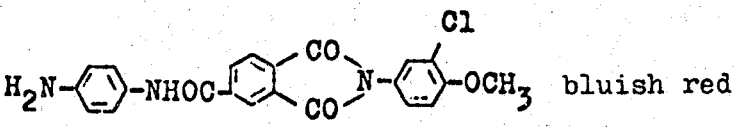 | bluish red |
| 149 | " | 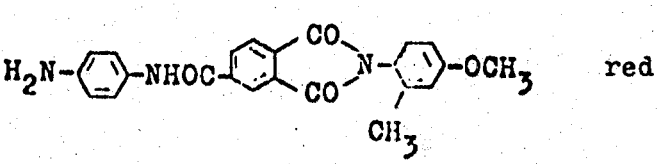 | red |
| 150 | 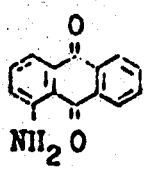 | 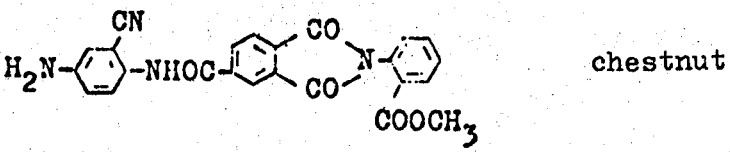 | chestnut |
| 151 | " | 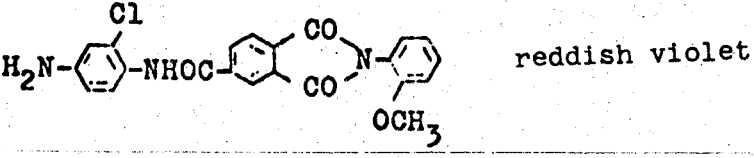 | reddish violet |

| | | | |
|---|---|---|---|
| 152 | " | 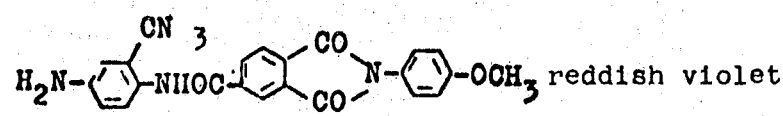 | reddish violet |
| 153 | " | 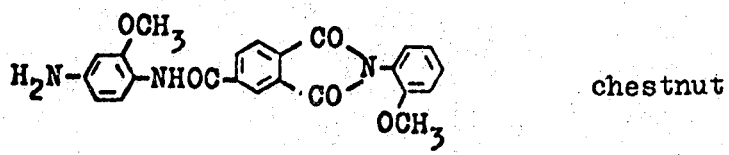 | chestnut |
| 154 | " | 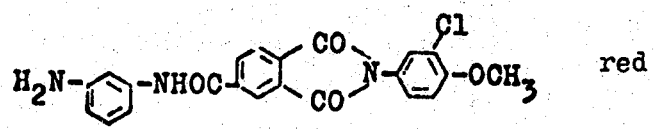 | red |
| 155 | " | 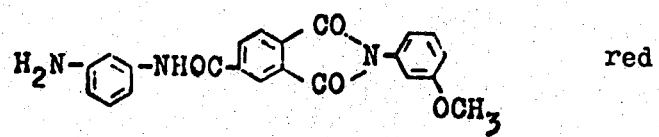 | red |
| 156 | " | 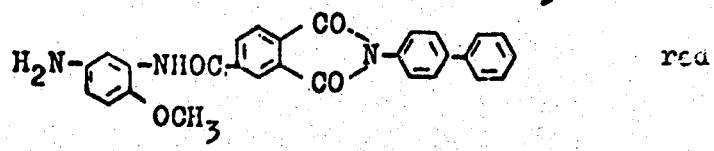 | red |
| 157 | " | 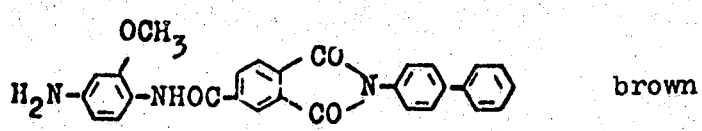 | brown |
| 158 | " | 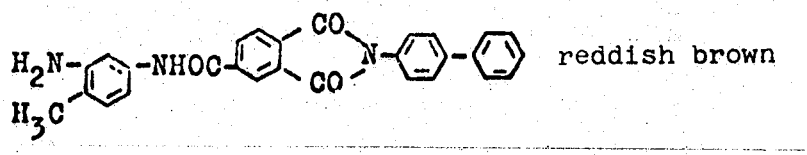 | reddish brown |
| 159 | " | 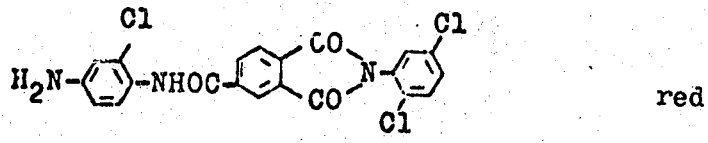 | red |
| 160 | " | 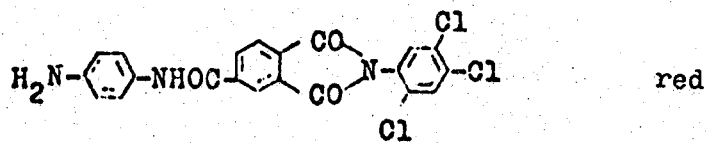 | red |
| 161 | 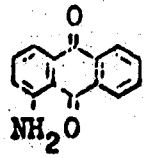 | 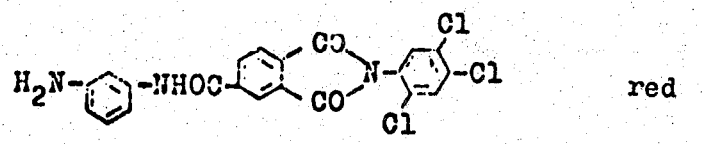 | red |
| 162 | " | 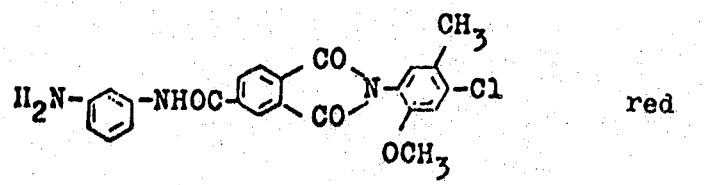 | red |

| | | | |
|---|---|---|---|
| 163 | " | 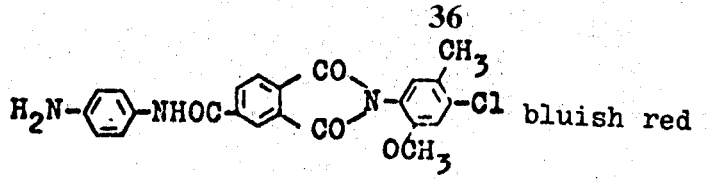 | bluish red |
| 164 | " | 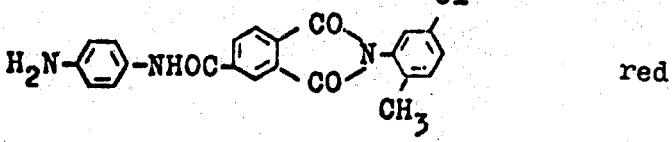 | red |
| 165 | " | 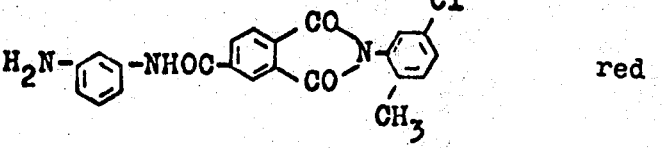 | red |
| 166 | " | 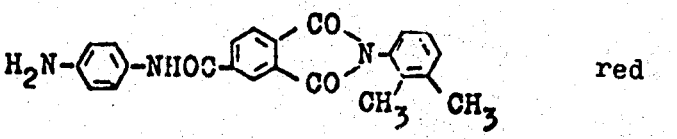 | red |
| 167 | " | 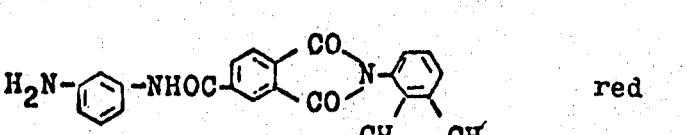 | red |
| 168 | " | 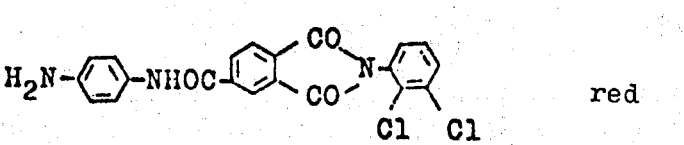 | red |
| 169 | " | 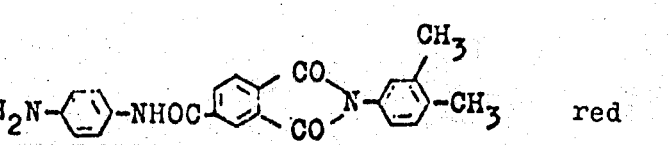 | red |
| 170 | 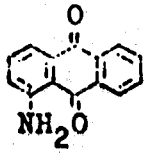 | 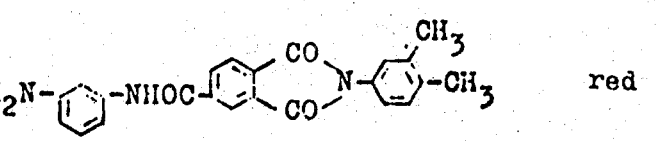 | red |
| 171 | " | 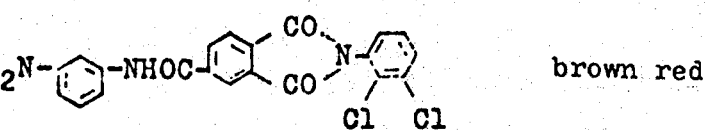 | brown red |
| 172 | " | 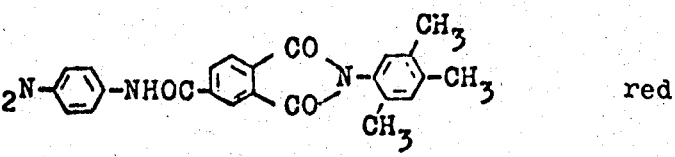 | red |
| 173 | " | 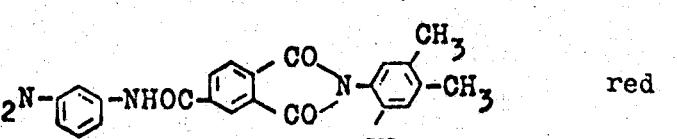 | red |

| | 37 | | 38 |
|---|---|---|---|
| 174 | " | 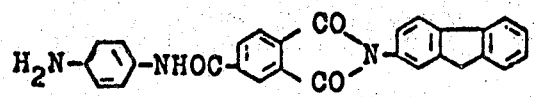 | red |
| 175 | " | 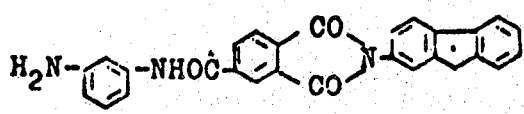 | red |
| 176 | " | 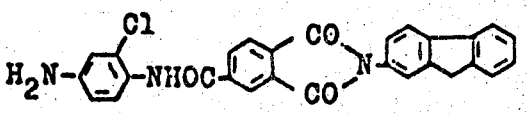 | chestnut |
| 177 | " | 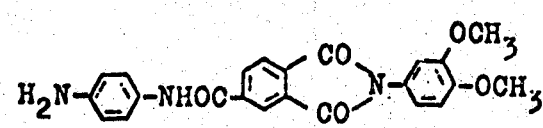 | red |
| 178 | " | 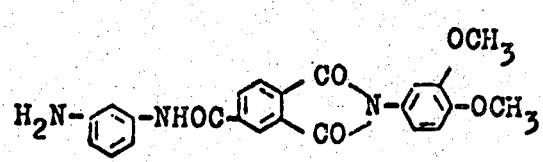 | red |
| 179 | " | 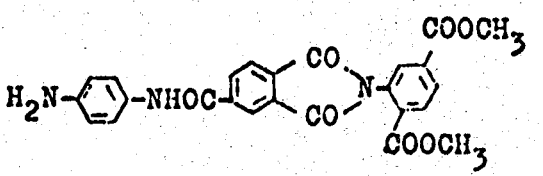 | red |
| 180 | 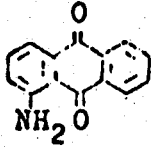 | 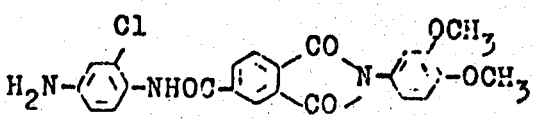 | red |
| 181 | " | 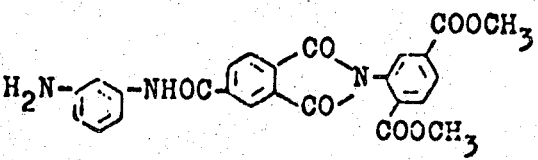 | red |
| 182 | " | 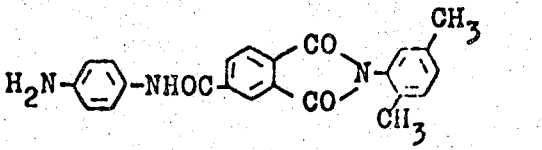 | red |
| 183 | " | 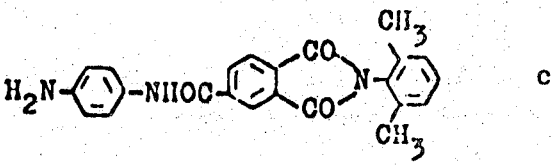 | chestnut |
| 184 | " | 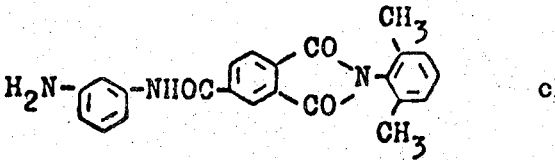 | chestnut |
| 185 | " | 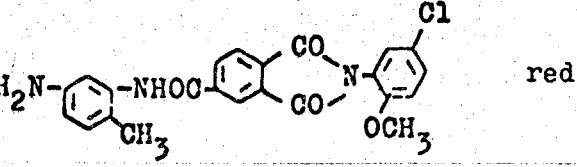 | red |

| | | | |
|---|---|---|---|
| 186 | " | 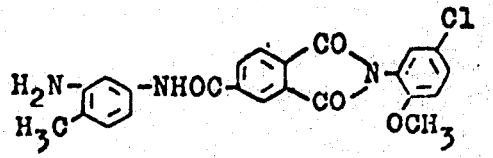 | red |
| 187 | " | 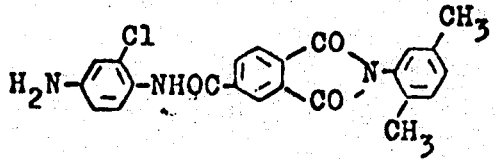 | red |
| 188 | " | 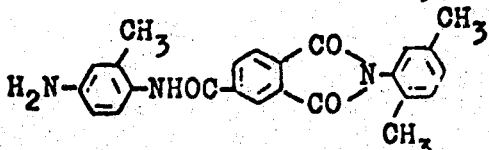 | red |
| 189 | " | 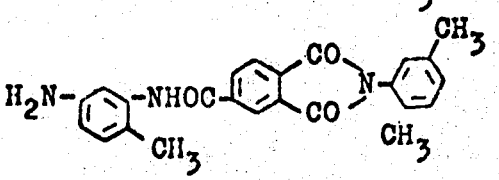 | red |
| 190 | " | 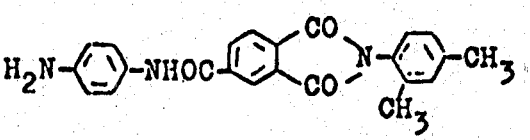 | red |
| 191 | 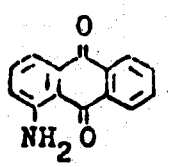 | 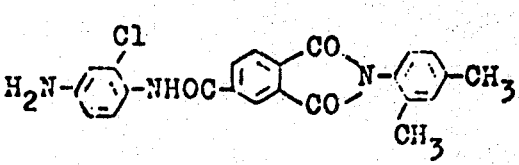 | red |
| 192 | " | 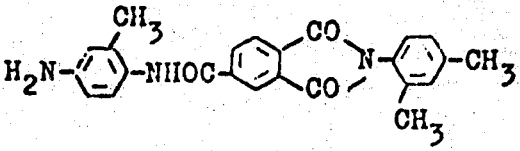 | red |
| 193 | " | 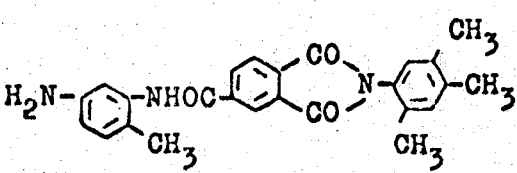 | red |
| 194 | " | 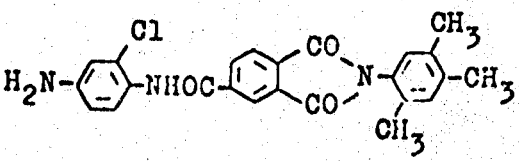 | red |
| 195 | " | 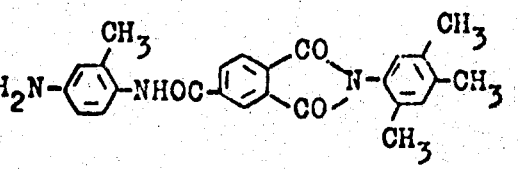 | red |
| 196 | " | 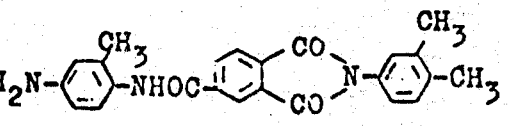 | red |

| | | | |
|---|---|---|---|
| 197 | " | 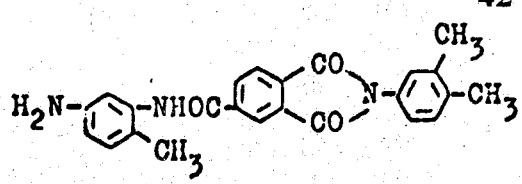 | red |
| 198 | " | 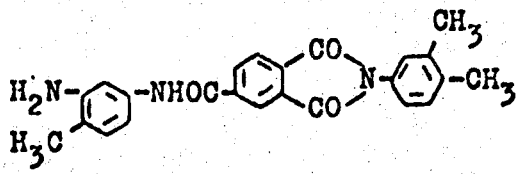 | red |
| 199 | " | 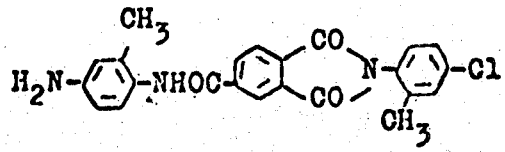 | red |
| 200 | " | 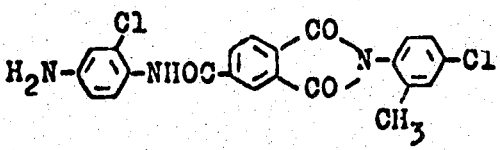 | red |
| 201 | 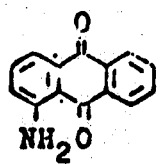 | 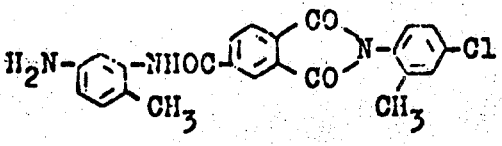 | red |
| 202 | " | 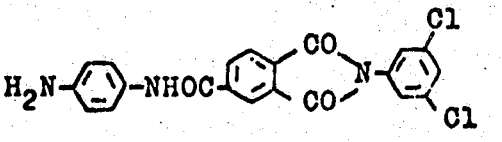 | red |
| 203 | " | 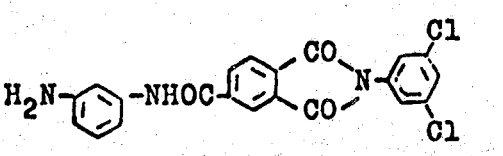 | red |
| 204 | " | 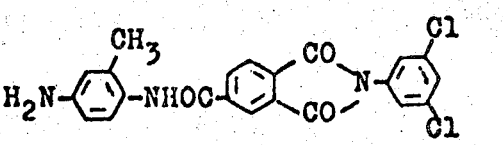 | red |
| 205 | " | 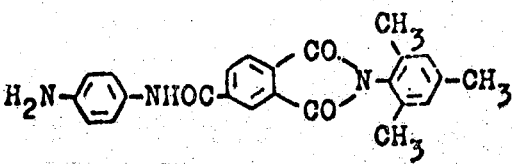 | red |
| 206 | " | 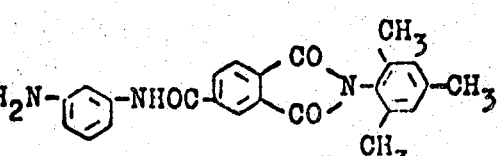 | red |
| 207 | " | 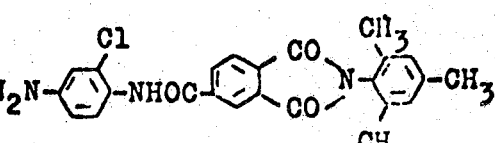 | red |

| No. | | Structure | Color |
|---|---|---|---|
| 208 | " | H2N-(C6H3(CH3))-NHOC-(C6H4)-(CO)2N-(C6H2(CH3)3) | red |
| 209 | " | H2N-(C6H3(Cl))-NHOC-(C6H4)-(CO)2N-(C6H4-OCH3) | chestnut |
| 210 | " | H2N-(C6H4)-NHOC-(C6H4)-(CO)2N-(C6H4-CH3) | red |
| 211 | 1-amino-anthraquinone | H2N-(C6H4)-NHOC-(C6H4)-(CO)2N-(C6H4-CH3) | red |
| 212 | " | H2N-(C6H4)-NHOC-(C6H4)-(CO)2N-(anthraquinonyl) | red |
| 213 | " | H2N-(C6H4)-NHOC-(C6H4)-(CO)2N-(C6H4-Br) | red |
| 214 | " | H2N-(C6H4)-NHOC-(C6H4)-(CO)2N-(C6H4-Br) | red |
| 215 | " | H2N-(C6H4)-NHOC-(C6H4)-(CO)2N-(C6H4-Br) | red |
| 216 | " | H2N-(C6H4)-NHOC-(C6H4)-(CO)2N-(C6H4-Br) | red |
| 217 | " | H2N-(C6H4)-NHOC-(C6H4)-(CO)2N-(C6H3(CH3)(Cl)) | red |
| 218 | " | H2N-(C6H4)-NHOC-(C6H4)-(CO)2N-(C6H4)-CO-NH-CO | chestnut |
| 219 | " | H2N-(C6H4)-NHOC-(C6H4)-(CO)2N-(C6H4)-CO-(C6H5) | chestnut |

| | | | |
|---|---|---|---|
| 220 | " | 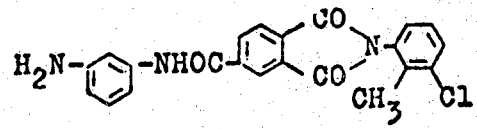 | red |
| 221 | " | 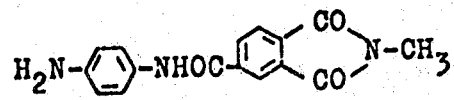 | red |
| 222 | " | 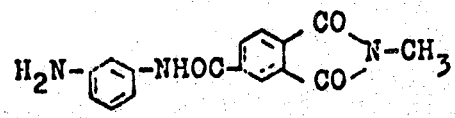 | chestnut |
| 223 | 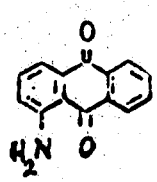 | 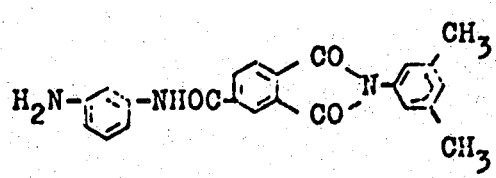 | red |
| 224 | " | 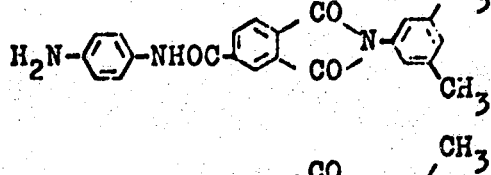 | red |
| 225 | " | 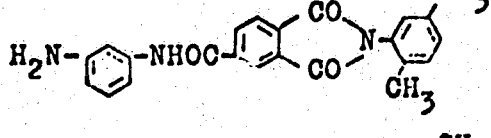 | red |
| 226 | " | 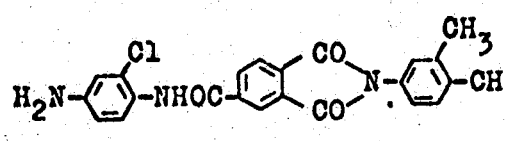 | red |
| 227 | " | 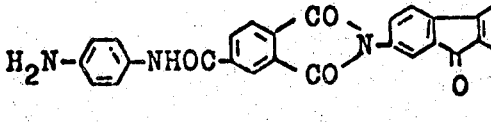 | red |
| 228 | " | 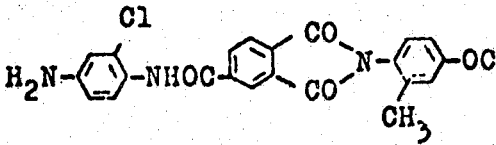 | red |
| 229 | " | 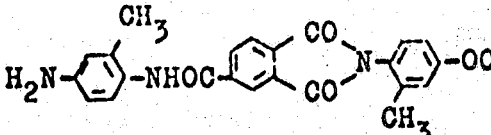 | red |
| 230 | " | 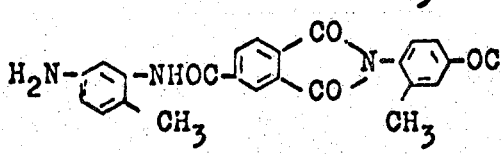 | red |
| 231 | " | 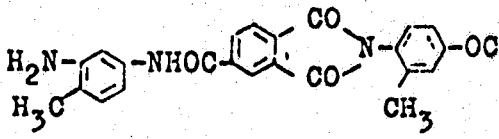 | red |

| No. | | Structure | Color |
|---|---|---|---|
| 232 | " | H₂N—(2-Cl,4-)—NHOC—[cyclohexane-1,2-(CO)₂N]—(2-Cl,5-OCH₃-phenyl) | red |
| 233 | 1-amino-anthraquinone | H₂N—(3-CH₃,4-)—NHOC—[phthalimido]—(2-Cl,5-OCH₃-phenyl) | red |
| 234 | " | H₂N—(3-Cl,4-)—NHOC—[phthalimido]—(3-Cl,6-OCH₃-phenyl) | red |
| 235 | " | H₂N—(3-CH₃,4-)—NHOC—[phthalimido]—(3-Cl,6-OCH₃-phenyl) | red |
| 236 | " | H₂N—(3-CH₃-phenyl)—NHOC—[phthalimido]—(2,4,6-tri-CH₃-phenyl) | red |
| 237 | " | H₂N—(2,5-di-Cl,4-)—NHOC—[phthalimido]—(2-OCH₃-phenyl) | red |
| 238 | " | H₂N—(3,5-di-CH₃,4-)—NHOC—[phthalimido]—(phenyl) | red. |
| 239 | " | H₂N—(3,5-di-OCH₃,4-)—NHOC—[phthalimido]—(phenyl) | violet |
| 240 | " | H₂N—(3-COOCH₃-phenyl)—NHOC—[phthalimido]—(2,6-di-CH₃-phenyl) | red |
| 241 | " | H₂N—(3-COHN-phenyl-phenyl)—NHOC—[phthalimido]—(2-Cl-phenyl) | brown |
| 242 | " | H₂N—(phenyl)—NHOC—[phthalimido]—(2-CF₃,4-Cl-phenyl) | red |

| | 49 | 50 | |
|---|---|---|---|
| 243 | 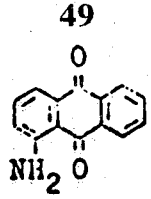 | 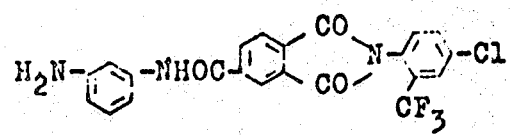 | orange |
| 244 | " | 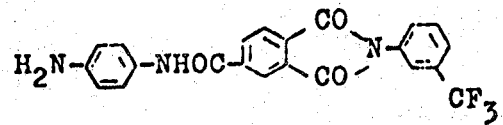 | red |
| 245 | " | 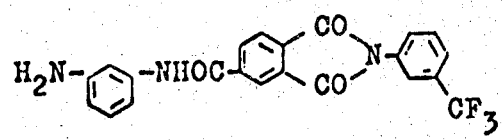 | red |
| 246 | " | 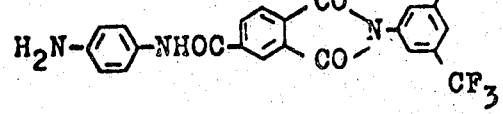 | violet |
| 247 | " | 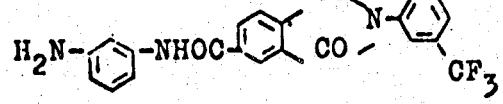 | red |
| 248 | " | 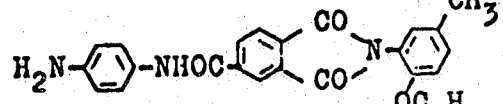 | rEd |
| 249 | " | 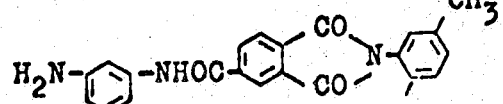 | red |
| 250 | " | 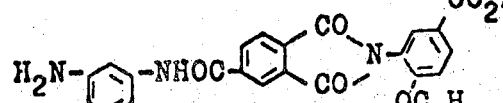 | red |
| 251 | " | 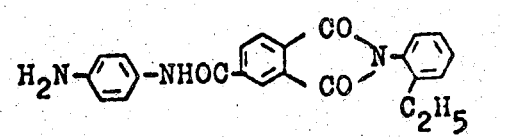 | red |
| 252 | " | 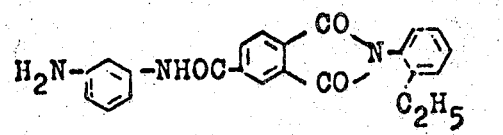 | red |
| 253 | " | 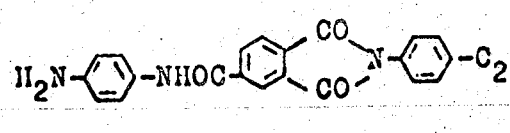 | red |
| 254 | 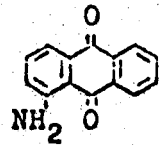 | 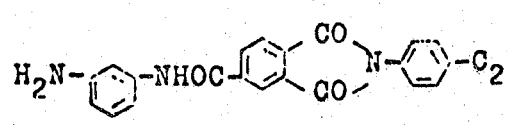 | red |

| No. | 51 | 52 | Color |
|---|---|---|---|
| 255 | " | H₂N–⟨⟩–NHOC–⟨⟩(CO)₂N–⟨⟩–N(CO)₂–⟨⟩ | reddish brown |
| 256 | " | H₂N–⟨⟩–NHOC–⟨⟩(CO)₂N–⟨⟩(Cl)(OCOCH₃) | red |
| 257 | " | H₂N–⟨⟩–NHOC–⟨⟩(CO)₂N–⟨⟩(Cl)–OCOCH₃ | red |
| 258 | " | H₂N–⟨⟩–NHOC–⟨⟩(CO)₂N–⟨⟩(Cl)–OSO₂–⟨⟩ | red |
| 259 | " | H₂N–⟨⟩–NHOC–⟨⟩(CO)₂N–⟨⟩(CH(CH₃)₂)(CH₃)₂ | red |
| 260 | " | H₂N–⟨⟩–NHOC–⟨⟩(CO)₂N–⟨⟩(CH(CH₃)₂)(CH₃)₂ | red |
| 261 | " | H₂N–⟨⟩–NHOC–⟨⟩(CO)₂N–⟨⟩–OCOCH₃ | red |
| 262 | " | H₂N–⟨⟩(Cl)–NHOC–⟨⟩(CO)₂N–⟨⟩–OCOCH₃ | red |
| 263 | " | H₂N–⟨⟩(CH₃)–NHOC–⟨⟩(CO)₂N–⟨⟩–OCOCH₃ | red |
| 264 | " | H₂N–⟨⟩–NHOC–⟨⟩(CO)₂N–⟨⟩–OCOCH₃ | red |
| 265 | " | H₂N–⟨⟩–NHOC–⟨⟩(CO)₂N–⟨⟩–OSO₂–⟨⟩ | red |
| 266 | 1-aminoanthraquinone | H₂N–⟨⟩–NHOC–⟨⟩(CO)₂N–⟨⟩(Cl)–OCOCH₃ | red |

| | | | |
|---|---|---|---|
| 267 | " | 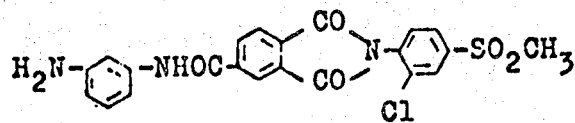 | red |
| 268 | " | 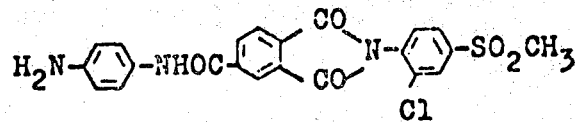 | red |
| 269 | " | 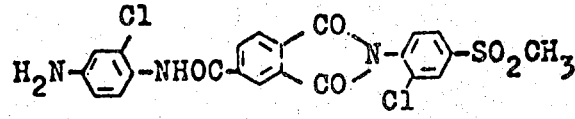 | red |
| 270 | " | 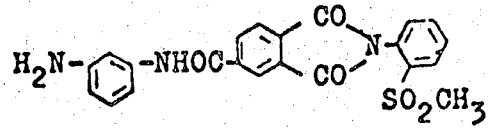 | red |
| 271 | " | 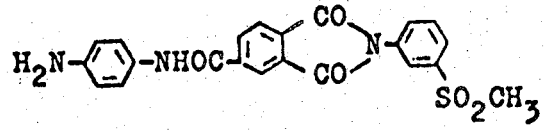 | red |
| 272 | " | 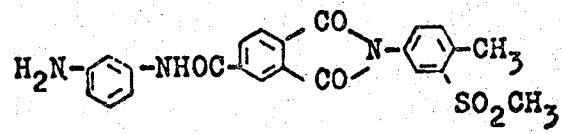 | red |
| 273 | " | 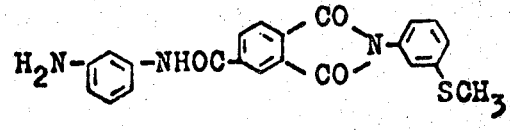 | red |
| 274 | " |  | bluish red |
| 275 | " | 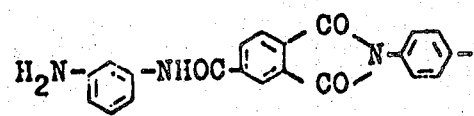 | bluish red |
| 276 | " | 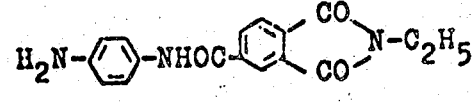 | red |
| 277 | " | 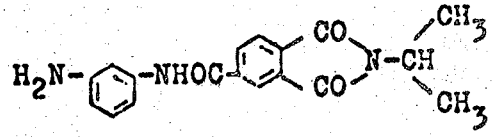 | red |
| 278 | 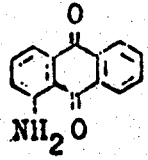 | 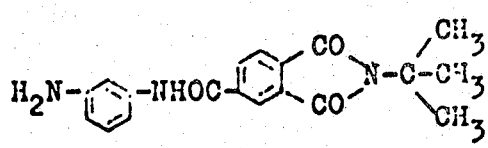 | red |
| 279 | " | 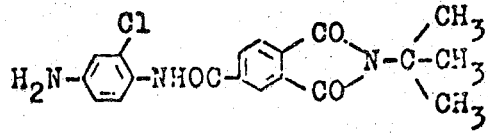 | red |

280 " 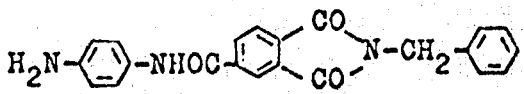 red

EXAMPLE 1

Use in coating compositions:

5 parts of the dye obtained according to Example 1 and 95 parts of baking enamel mixture (for example 70 percent of coconut alkyd resin, 60 percent solution in xylene and 30 percent of melamine resin, about 55 percent solution in a mixture of butanol and xylene) are ground in an attrition mill. After it has been applied to a substrate and baked for 30 minutes at 120°, brilliant full shade coatings are obtained having very good fastness to light and overcoating. Brilliant white effects are obtained by adding for example $TiO_2$.

When using the pigments described in the other Examples above, similar coatings are obtained in the shades specified.

EXAMPLE 2

Use in plastics:

Transparent polystyrene colorations having very good fastness to light are obtained by incorporating 0.05 part of dye obtained according to Example 21 into 100 parts of polystyrene.

Coloring is carried out at 190° to 220° in an extruder.

Polystyrene colorations having good hiding power are obtained analogously when 0.2 part of the above-mentioned dye, 1.0 part of $TiO_2$ and 100 parts of polystyrene are used.

When the pigments from the other Examples are used, similar results are obtained.

EXAMPLE 3

Use in printing inks:

5 parts of the dye obtained according to Example 50, 30 to 40 parts of resin (for example rosin modified with phenol-formaldehyde) and 65 to 55 parts of toluene are intimately mixed in a dispersing unit. A toluene intaglio printing ink having excellent fastness to light and outstanding brilliance is thus obtained.

When pigments from the other Examples are used, printing inks having similar properties and the shades specified are obtained.

We claim:

1. An azo pigment of the β-hydroxynaphthoic acid series of the formula:

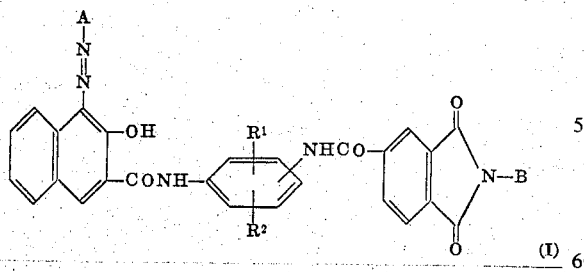

in which

A is 1-aminoanthraquinonyl, 2-aminoanthraquinonyl, 1-aminoanthraquinonyl or 2-aminoanthraquinonyl substituted by chlorine in the 3-or 4-position or 2,4,5-trichlorophenyl, $R^1$ is hydrogen, chlorine, bromine, methyl, ethyl, methoxy, ethoxy, methylsulfonyl, cyano, carbomethoxy, carboethoxy, carbamoyl, H-phenylcarbamoyl, chlorine, bromine, phenyl, methyl, methoxy, carbamoyl, sulfamoyl, carbomethoxy or cyano substituted N-phenylcarbamoyl or N-naphthylcarbamoyl; $R^2$ is hydrogen, chlorine, bromine, methyl, ethyl, methoxy, ethoxy, carbomethoxy or carboethoxy; and B is hydrogen, alkyl of one to four carbon atoms, β-hydroxyethyl, benzyl, phenylethyl, phenyl, phenyl substituted by fluorine, chlorine, bromine, alkyl of one to three carbon atoms, trifluoromethyl, methoxy, ethoxy, phenoxy, chlorophenoxy, phenyl, benzoyl, cyano, carbomethoxy, carbamoyl, sulfamoyl, acetoxy, benzoyloxy, methylsulfonyloxy, phenylsulfonyloxy, tolylsulfonyloxy, methylsulfonyl, methylmercapto, acetylamino, benzoylamino, chlorobenzoylamino, methylbenzoylamino or nitro; naphthyl, naphthyl substituted by chlorine or methyl; anthraquinonyl, anthraquinonyl substituted by chlorine, bromine or methyl; or

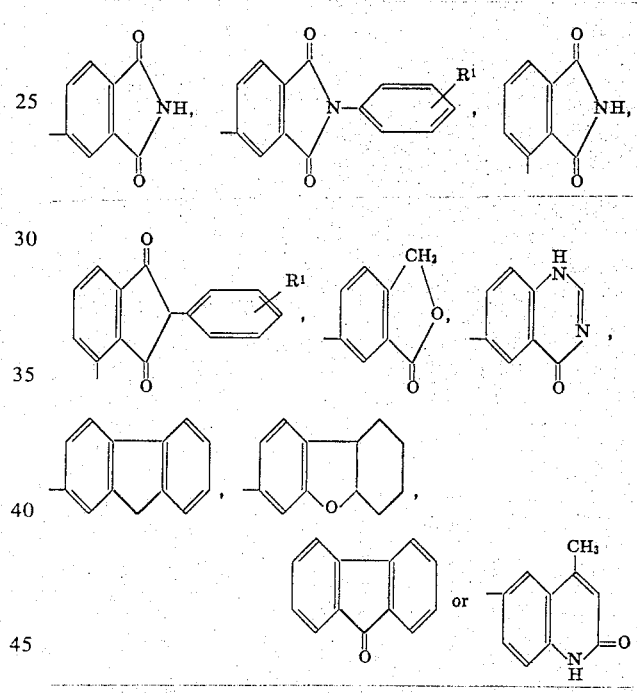

in which $R^1$ has the meanings given above, and in which the —NH—CO— groups in formula (I) are in meta-position or para-position to one another.

2. A dye as set forth in claim 1 in which $R^1$ denotes hydrogen, chlorine, cyano, methyl or methoxy; $R^2$ denotes hydrogen, chlorine, methyl or methoxy; and B denotes phenyl or naphthyl or phenyl or naphthyl substituted by chlorine, methyl, ethyl, methoxy, ethoxy, phenoxy, benzoyl, phenyl, carbomethoxy, carboethoxy, N-phenylsulfonamido or N-phenylcarbamoyl or a radical of the formula:

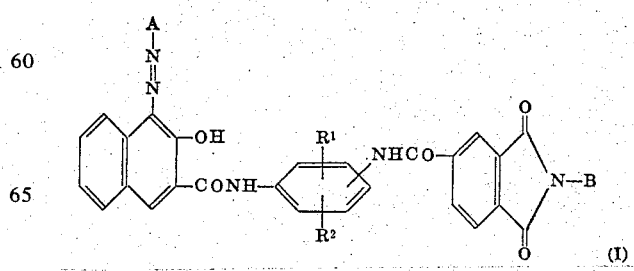

and A has the meanings given in claim 1.

* * * * *

UNITED STATES PATENT AND TRADEMARK OFFICE
CERTIFICATE OF CORRECTION

PATENT NO. : 3,821,191
DATED : June 28, 1974
INVENTOR(S) : Guenther Ruider and Peter Dimroth It is certified that error appears in the above-identified patent and that said Letters Patent are hereby corrected as shown below:

In Column 1, in the heading, insert--[30] Foreign Application Priority Data, December 4, 1970, Germany, and P 20 59 677.4--;

Column 55, line 42, delete "soluene" and substitute --toluene--;

Column 56, line 65, delete

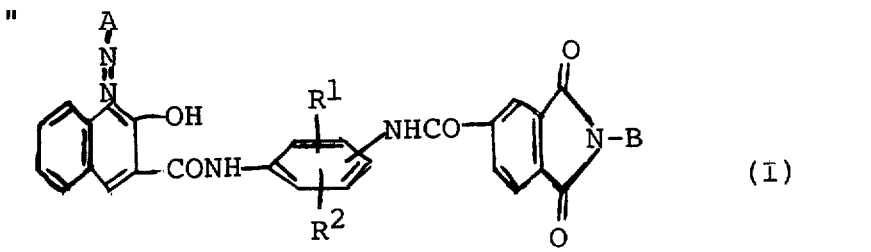

and substitute

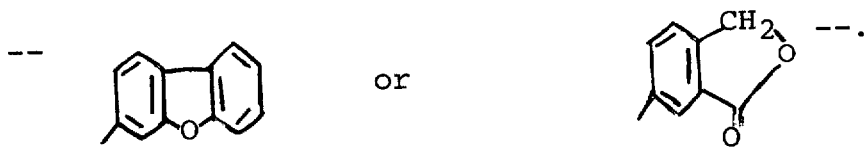

Signed and Sealed this sixth Day of January 1976

[SEAL]

Attest:

RUTH C. MASON
Attesting Officer

C. MARSHALL DANN
Commissioner of Patents and Trademarks